US008661057B1

(12) United States Patent
MacKenzie et al.

(10) Patent No.: US 8,661,057 B1
(45) Date of Patent: \*Feb. 25, 2014

(54) METHODS AND APPARATUS FOR POST-SEARCH AUTOMATED FULL-ARTICLE RETRIEVAL

(75) Inventors: Malcolm James MacKenzie, Belmont, MA (US); Uri Blank, Brighton, MA (US); Nick Polyak, Brighton, MA (US)

(73) Assignee: Elsevier Inc., Wilmington, DE (US)

( \* ) Notice: Subject to any disclaimer, the term of this patent is extended or adjusted under 35 U.S.C. 154(b) by 0 days.

This patent is subject to a terminal disclaimer.

(21) Appl. No.: 13/010,882

(22) Filed: Jan. 21, 2011

Related U.S. Application Data

(63) Continuation-in-part of application No. 11/496,735, filed on Jul. 31, 2006, now Pat. No. 7,900,241.

(51) Int. Cl.
*G06F 7/00* (2006.01)
*G06F 17/30* (2006.01)

(52) U.S. Cl.
USPC ............................ 707/781; 707/740; 707/741

(58) Field of Classification Search
USPC ........................... 707/740, 741, 999.102, 781
See application file for complete search history.

(56) References Cited

U.S. PATENT DOCUMENTS

| 6,112,201 | A  | * | 8/2000 | Wical ................................... 1/1 |
| 6,581,057 | B1 | * | 6/2003 | Witbrock et al. ..................... 1/1 |
| 6,701,314 | B1 | * | 3/2004 | Conover et al. ............... 707/740 |
| 7,107,448 | B1 | * | 9/2006 | MacKay et al. ............... 713/171 |
| 2002/0002543 | A1 | * | 1/2002 | Spooren et al. ................. 705/57 |
| 2003/0065642 | A1 | * | 4/2003 | Zee ................................... 707/1 |
| 2006/0212435 | A1 | * | 9/2006 | Williams et al. ................. 707/3 |
| 2007/0016583 | A1 | * | 1/2007 | Lempel et al. .................... 707/9 |

\* cited by examiner

*Primary Examiner* — Alexy Shmatov
(74) *Attorney, Agent, or Firm* — Chapin IP Law, LLC

(57) ABSTRACT

A system renders at least one content library in an organization region. The content library represents content that is accessible via a policy. The system receives a selection to obtain the content represented by the content library, and renders content information that represents a listing of the content contained within the content library. The content information is displayed within a listing region wherein the content may be accessible via the policy. The system downloads the content for which access has been granted via the policy. The content is downloaded from a content source provider.

32 Claims, 19 Drawing Sheets

FIG. 3

205 RENDER AT LEAST ONE CONTENT LIBRARY IN AN ORGANIZATION REGION, THE AT LEAST ONE CONTENT LIBRARY REPRESENTING CONTENT THAT IS ACCESSIBLE VIA A POLICY

206 RECEIVE A SELECTION OF THE AT LEAST ONE RESEARCH DATABASE FROM WHICH TO CREATE THE AT LEAST ONE CONTENT LIBRARY

207 RECEIVE AT LEAST ONE SEARCH CRITERION WITH WHICH TO FILTER CONTENT ON THE AT LEAST ONE RESEARCH DATABASE

208 PERFORM A SEARCH ON THE AT LEAST ONE RESEARCH DATABASE USING THE AT LEAST ONE SEARCH CRITERION

209 CREATE THE AT LEAST ONE CONTENT LIBRARY FROM A RESULT OF THE SEARCH ON THE AT LEAST ONE RESEARCH DATABASE

210 STORE THE AT LEAST ONE CONTENT LIBRARY LOCALLY

*FIG. 8*

211 CREATE THE AT LEAST ONE CONTENT LIBRARY FROM A RESULT OF THE SEARCH ON THE AT LEAST ONE RESEARCH DATABASE

212 RECEIVE A SELECTION OF A FORMAT IN WHICH TO RETRIEVE THE CONTENT FROM THE CONTENT SOURCE PROVIDERS

OR

213 RECEIVE AN INDICATION OF AN AMOUNT OF CONTENT TO RETRIEVE FROM THE CONTENT SOURCE PROVIDERS

*FIG. 9*

220 RECEIVE A SELECTION TO OBTAIN THE CONTENT REPRESENTED BY THE AT LEAST ONE CONTENT LIBRARY

221 RECEIVE A SELECTION TO VIEW AN ANNOTATION ASSOCIATED WITH THE AT LEAST ONE CONTENT FOLDER ASSOCIATED WITH THE AT LEAST ONE CONTENT LIBRARY, THE ANNOTATION PROVIDING AN EXPLANATION ASSOCIATED WITH THE AT LEAST ONE CONTENT FOLDER

OR

222 RECEIVE A SELECTION TO EDIT THE ANNOTATION ASSOCIATED WITH THE AT LEAST ONE CONTENT FOLDER

*FIG. 11*

```
┌─────────────────────────────────────────────────────────────────┐
│ 223 RENDER CONTENT INFORMATION THAT REPRESENTS A LISTING OF THE │
│ CONTENT CONTAINED WITHIN THE AT LEAST ONE CONTENT LIBRARY, THE  │
│ CONTENT INFORMATION DISPLAYED WITHIN A LISTING REGION WHEREIN THE│
│ CONTENT MAY BE ACCESSIBLE VIA THE POLICY                         │
│                                                                  │
│   ┌──────────────────────────────────────────────────────────┐  │
│   │ 224 OBTAIN A LOCATION ASSOCIATED WITH A FILE WITHIN THE AT│  │
│   │ LEAST ONE CONTENT FOLDER WITHIN THE AT LEAST ONE CONTENT  │  │
│   │ LIBRARY                                                   │  │
│   └──────────────────────────────────────────────────────────┘  │
│                              │                                    │
│                              ▼                                    │
│   ┌──────────────────────────────────────────────────────────┐  │
│   │ 225 ASSOCIATE THE LOCATION OF THE FILE WITH THE CONTENT   │  │
│   │ INFORMATION                                               │  │
│   └──────────────────────────────────────────────────────────┘  │
│                              │                                    │
│                              ▼                                    │
│   ┌──────────────────────────────────────────────────────────┐  │
│   │ 226 DISPLAY THE CONTENT INFORMATION WITH A CONTENT IDENTIFIER│
│   │ IDENTIFYING A FORMAT ASSOCIATED WITH THE FILE             │  │
│   └──────────────────────────────────────────────────────────┘  │
└─────────────────────────────────────────────────────────────────┘
                              │
                              ▼
```

FIG. 12

METHODS AND APPARATUS FOR POST-SEARCH AUTOMATED FULL-ARTICLE RETRIEVAL

CROSS REFERENCE TO RELATED APPLICATIONS

The present application is a continuation-in-part of U.S. patent application Ser. No. 11/496,735 filed on Jul. 31, 2006, now U.S. Pat. No. 7,900,241 which is incorporated herein by reference in its entirety.

BACKGROUND

Research databases provide a wealth of technical and scientific information for researchers (i.e., commercial, academic, etc.). Research databases provide links to online libraries of documents related to medicine, government, etc., complete with searchable citations, bibliographies, etc., associated with those documents. Users can search the research databases by entering search criteria. From the results produced by a search, the user can download those documents of interest.

Online content source providers offer users the ability to access copyrighted material to read, print, or otherwise utilize documents via the appropriate conditional access to online versions of such documents. Such conditional access, if not available at no charge, is typically provided under a subscription or under a "pay per view" or one-time payment per item. Examples of content source providers are the original publisher of a document or content aggregators.

Research databases may provide search capabilities and links to i) documents for which only third parties are the content source providers, or ii) only documents for which the research database provider itself is the content source provider, or iii) a mixture of documents where either a third party or the research database provider is the content source provider.

Some content source providers are accessible to any user, while other content source providers require a subscription for access. The terms of the subscriptions vary and are set by platform providers and publishers. Subscriptions are purchased (either on individual level or as a package covering multiple users) by users. Generally, for any type of publisher content covered under their subscription, each user can download copyrighted materials to own computer, and keep them there for a period of time. But after copyrighted material is downloaded to a shared environment, in some cases multiple users cannot use the copyrighted material even if those users are a part of the same subscription group. In some cases, the copyrighted materials cannot be stored on an infrastructure where multiple users can access the copyrighted materials, instead of going to the original source of copyrighted materials.

It is commonly permissible to expose a full-text index of copyrighted materials to multiple users even when it is not permissible to expose the source document itself. Hence an organization could benefit from a content library with full-text searching for copyrighted materials consistent with its copyright permissions if it could create a content library which contained a full-text index of the documents of interest. However there is no ready means whereby users of research databases can create a usable index of this kind for documents coming from a large number of different content providers.

SUMMARY

Conventional technologies for managing and sharing search results suffer from a variety of deficiencies. In particular, conventional technologies for managing and sharing search results are limited in that creating and sharing a content library obtained from subscription-based content source provider may violate copyright laws and or publisher terms and conditions. For example, a first user who has access to a research database, performs a search, and downloads a collection of documents (i.e., a content library) from a content source provider. The first user then uploads the collection of documents to a server accessible by other users. The first user, by loading, and other users, by accessing, that collection of documents on the server may be violating copyright law even if all these users possess a paid subscription to the content source provider. Every user that possesses a paid subscription to the content source provider may need to obtain their own copy of the content.

Yet, the searches performed by the first user produced a very valuable set of relevant documents. Requiring other users to perform the same searches in order to download the full text of the content is an unnecessary duplication of efforts and may not result in the optimum collection of research documents. For example, a first user may compile a collection of documents, including adding notes or annotations to the collection indicating which documents within the collection may be most relevant to other users. If other users have to repeat the same searches, those annotations will not be propagated along with the results of the new searches. Thus users of research databases are faced with either the possibility of violating copyright laws or of repeating searches to produce a collection of documents and thereby both duplicating effort and losing the value of annotations provided by colleagues.

One way for realizing the value of the first user's search and annotations is to create a content library which contains a full-text index of the documents of interest without containing the source documents for copyrighted material. Compiling such a library, referencing documents from a wide range of content source providers and identified by a large number of individual users, is difficult.

Embodiments disclosed herein significantly overcome deficiencies of conventional technologies and provide a system that includes a computer system executing an article retrieving process and full text search. The resulting system is perceived by the end users as a full text database of copyrighted material but, in fact, does not need to contain any copyrighted data but only methods of search and retrieval or re-retrieval in the case that copyright conditions require re-retrieval.

The article retrieving process allows a user to choose a research database and perform a search. Once the search is performed, the results are displayed in the form of abstracts (i.e., abbreviated version of the documents) or other metadata in a view region within an article retrieving process graphical user interface. In other words, the user performs a search on the online database using the search interface of that online database. After the user is satisfied with the results of the search, the user then can retrieve the documents in the desired format (e.g., PDF or HTML). The user then can search within the results displayed in a listing region to further refine the document set.

For example, the user may search on documents related to high cholesterol, and then further search in those results. For example, a user can perform a Boolean search of a desired content source provider for "LDL" and "greater than 190" to find those documents that are related to Low-density lipoprotein (LDL) over 190. After performing the search, the user can specify how many documents in the search results shown in the view region to retrieve using links provided by the research database to content source provider(s) (i.e., to download from the content source providers) and in which format to return the results (i.e., PDF documents, HTML documents, etc.).

The results of the retrieval are displayed in a listing region within the article retrieving process graphical user interface. The listing region lists each of the documents as a result of the retrieval, along with an icon indicating the format of the document (i.e., PDF, etc.), the author(s) of the documents and the title. Each listing of a document itemized within the listing region is a reference to that document. By selecting the reference to the document, a user can choose to view the already retrieved document. As understood in the art, users only could have retrieved the document from the content source provider if the user has the right of access (e.g., a paid subscription) to that document. Otherwise, only metadata and/or an abstract of the document are displayed. The user can save the listing of the retrieved documents to a content library such that other users can benefit from the results of the search. To avoid limitations in the search and analysis of the documents in the content library, an index of full-text and metadata of the retrieved documents is created on the user computer. The full text index saved to a content library is propagated to that library at the time the metadata for those documents is saved to the content library and automatically combined with the indexes of documents added by other users so that all documents added to the content library can be discovered via a full-text or metadata search by any user. Thus a composite index of both full-text and metadata of all shared documents is automatically created by the normal actions of user of the system in downloading and saving articles to a shared content library.

The user can add annotations to the documents and save the annotations along with other document metadata to the content library. The user can upload the content library to a server where other users can access the content library.

Other users can access the content library, including the listing of the results within the listing region, and search the annotations associated with that content library, or search any other metadata or full text. However, other users selecting the reference to the document (from within the listing region) will only be able to retrieve/download the document from the content source provider if those other users have the right of access to the documents.

In other words, the content library created by the initial user contains references to the actual documents, metadata about the documents and any annotations that the user added to the content library, but does not contain the actual documents. When other users access the content library, those users have direct access to the references to the actual documents, but not the actual documents. The document is only downloaded/retrieved from the content source provider when a user has the right of access to that content. When a user retrieves documents found via the content library, those documents can be re-retrieved directly from the content source provider (provided the user has access rights) and stored locally on the user's computer or other storage.

The article retrieving process adds the latest retrieval to a listing of all the user's content libraries in an organization region in the graphical user interface used for article retrieving as well as content library searching, browsing, and organization. The organization region presents the user's searches and the user's content libraries. The content libraries each have an icon indicating whether that content library is stored locally, or whether the content library has been uploaded to a server accessible by other users. If a content library has been uploaded to a shared server, and the content library has been updated since the last time the user downloaded that content library locally, for example, to the user's computer, an icon on the content library will indicate to the user that the user no longer has the most updated version of that content library.

The article retrieving process from the shared server renders at least one content library in an organization region in a graphical user interface. The content library represents content (i.e., documents from various content source providers) that is accessible via a policy (e.g., a paid subscription). The article retrieving process receives a selection to obtain the content represented by the content library and a method to access each document, and renders content information that represents a listing of the content contained within the content library. The content information is displayed within a listing region which contains content information, or references to the content (i.e., documents from various content source providers).

Depending on whether the user trying to access the content information has access, the content information may represent content that is accessible to the user. That is, any user can view the content information within the listing region, but only users who have access to that content via the content source provider can access the content represented by the content listing. The article retrieving process downloads the content (from a content source provider) for which access has been granted via the policy.

During an example operation of one embodiment, suppose a user, using the article retrieving process via a graphical user interface, wants to perform research that may be of value to other colleagues. The user selects a research database, such as a medical research database, and performs a search. The medical research database returns the results in the form of abbreviated versions (i.e., abstracts and or citation information references) of the content (i.e., medical articles listed on the medical research database) in the view region of the graphical user interface.

The user reviews the abstracts or references, and selects, for example, ten of them by selecting a check box next to each one within the view region of the graphical user interface, then selects "Retrieve" from the view region toolbar. In the listing region, content information associated with the selected ten abstracts or references is displayed. The content information includes the author of each of the publisher content documents as well as the title associated with each one. An icon next to each of the references listed indicates the format (i.e., PDF, HTML, etc.) of the content (i.e., document, article, etc.) associated with each abstract or reference. The content information is a reference to the actual publisher content (i.e., documents, articles, etc.) and data structures needed to build full text search capability on the server.

The user may add an annotation to several of the documents and may edit some of the annotations to include more information for the user's colleagues. The content library is then generated and stored on the user's computer, and is displayed within an organization region within the article retrieving process graphical user interface. The content library is displayed with an icon indicating the content library is available locally only to the user. The user may select the content library from the organization view and upload the content library (but not the actual publisher documents) to a shared server so that the user's colleagues can also view and search in the content library. The content library in the user's organization view is now displayed with an icon indicating the content library has been uploaded to a shared server, and is available to other users.

The user's colleagues can access the content library, including viewing the annotations provided by the user. The user's colleagues can search and download the content from the content source provider if the users have the right of access to the content at the content source provider. If any of the user's colleagues modify the content library, the icon on the user's organization view will indicate the content library has been modified since the last time the user downloaded the content library from the shared server or, in this case, since the content library was uploaded from the user's computer to the server. Search methods of the content library are maintained automatically to allow search of its content.

Other embodiments disclosed herein include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment disclosed herein.

Other embodiments disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein as embodiments disclosed herein.

The features disclosed herein may be employed in data communications devices and other computerized devices and software systems for such devices such as those manufactured by QUOSA, Inc. of Waltham, Mass.

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views. The drawings are not necessarily to scale, with emphasis instead being placed upon illustrating the principles disclosed herein.

FIG. 3 is an example screenshot of the article retrieve process displaying a search of the results listed in the listing region, according to one embodiment disclosed herein.

FIG. 8 illustrates a flowchart of a procedure performed by the system of FIG. 1 when the article retrieving process renders at least one content library in an organization region, and receives a selection of the research database from which to create the at least one content library, according to one embodiment disclosed herein.

FIG. 9 illustrates a flowchart of a procedure performed by the system of FIG. 1 when the article retrieving process receives at least one search criterion with which to filter content on the content source provider, according to one embodiment disclosed herein.

FIG. 11 illustrates a flowchart of a procedure performed by the system of FIG. 1 when the article retrieving process receives a selection to obtain the content represented by the at least one content library, according to one embodiment disclosed herein.

FIG. 12 illustrates a flowchart of a procedure performed by the system of FIG. 1 when the article retrieving process renders content information that represents a listing of the content contained within the at least one content library, the content information displayed within a listing region wherein the content may be accessible via the policy, according to one embodiment disclosed herein.

DETAILED DESCRIPTION

Figure 1:
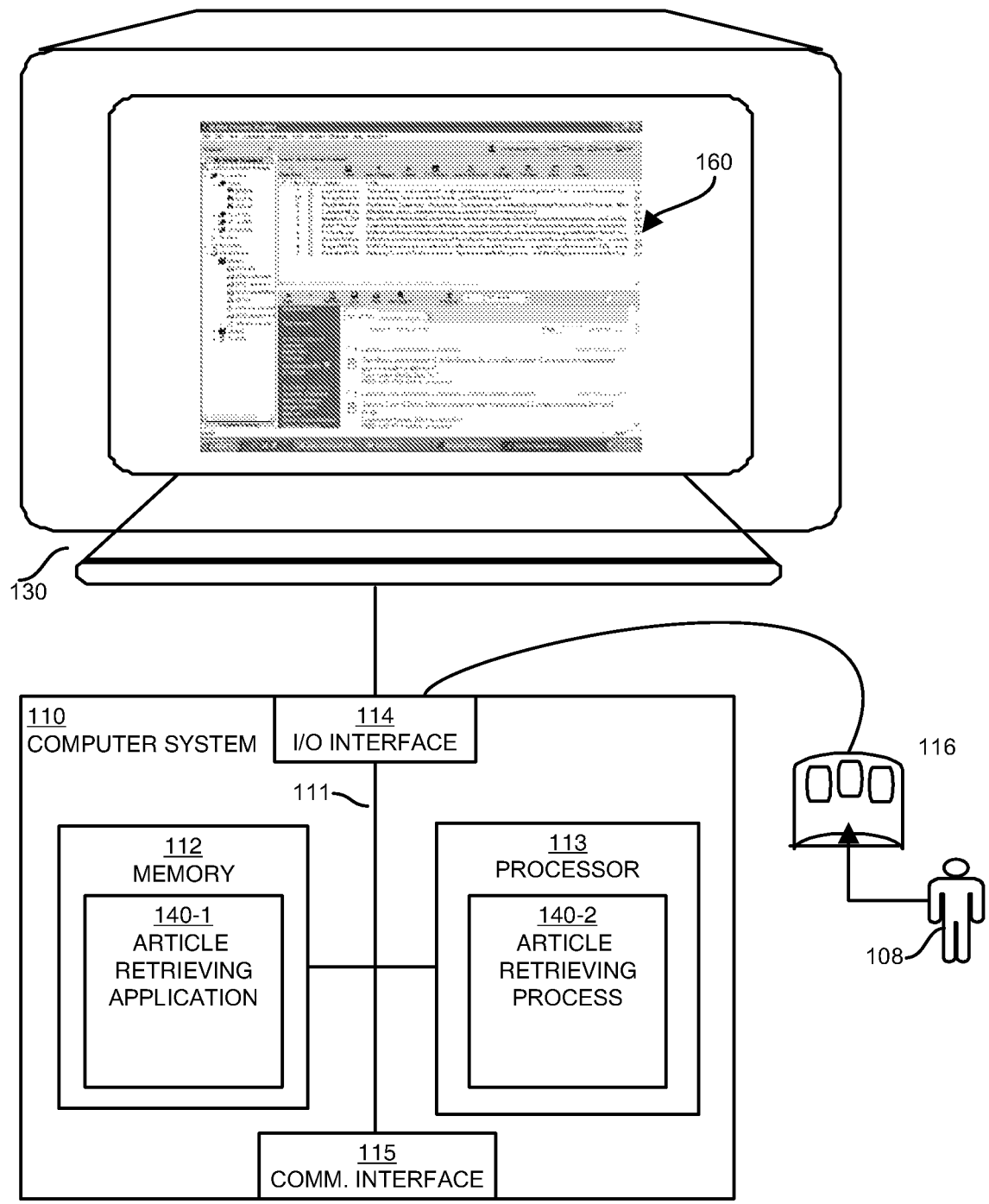
FIG. 1 shows a high-level block diagram of a computer system according to one embodiment disclosed herein.

Embodiments disclosed herein include methods and a computer system that perform an article retrieving process and full text search. The resulting system is perceived by the end users as a full text database of copyrighted material but, in fact, does not need to contain any copyrighted data but only methods of search and retrieval.

The article retrieving process allows a user to choose a research database and perform a search. Once the search is performed, the results are displayed in the form of abstracts (i.e., abbreviated version of the documents) or other metadata in a view region within an article retrieving process graphical user interface. In other words, the user performs a search on the research database (understood in the art as having references to publisher content available at one or more content source providers) using the search interface of that research database. After the user is satisfied with the results of the search, the user then can retrieve the documents from the content source provider for each document in the desired format (e.g., PDF or HTML). The user then can search within the results displayed in a listing region to further refine the document set.

For example, the user may search a research database on documents related to high cholesterol, and then further search in those results. For example, a user can perform a Boolean search of a desired content source provider for "LDL" and "greater than 190" to find those documents that are related to Low-density lipoprotein (LDL) over 190. After performing the search, the user can specify how many documents in the search results shown in the view region to retrieve from the relevant content source providers using links provided by the research database (i.e., download from the content source providers) and in which format to return the results (i.e., PDF documents, HTML documents, etc.).

The results of the retrieval are displayed in a listing region within the article retrieving process graphical user interface. The listing region lists each of the documents as a result of the retrieval, along with an icon indicating the format of the document (i.e., PDF, etc.), the author(s) of the documents and the title. Each listing of a document itemized within the listing region is a reference to that document. By selecting the reference to the document, a user can choose to view the already retrieved document. As understood in the art, users only could have retrieved the document from the content source provider for that document if the user has the right of access (e.g., a paid subscription) to that document. Otherwise, only metadata and/or an abstract of the document are displayed.

The user can save the listing of the retrieved documents to a content library such that other users can benefit from the results of the search. To avoid limitations in the search and analysis of the documents in the content library a full text index of the content library documents is created on the user computer. The user can add annotations to the documents and save the annotations along with the content library. The user can upload all the metadata in the content library including the full-text index but not the document itself to a shared server where other users can access the content library including searching for articles based on their full-text content. An index of the metadata is provided. Metadata can include authors, abstracts, titles, annotations, indexing terms, document formats and the like.

Other users can access the content library, including the listing of the results within the listing region, and search the annotations associated with that content library, or search metadata or full text. However, other users selecting the reference to the document (from within the listing region) will only be able to retrieve/download the document from the content source provider if those other users have the right of access to the documents.

In other words, the content library created by the initial user contains references to the actual documents, metadata about the documents and any annotations that the user added to the content library, but does not contain the actual documents. When other users access the content library, those users have access to the references to the actual documents, but not the actual documents. The document is only downloaded/retrieved from its content source provider when a user has the right of access to that content at that provider. When a user retrieves documents found via the content library, those documents can be retrieved directly from the relevant content source providers (provided the user has access rights) and stored locally on the user's computer or other storage.

The article retrieving process adds the latest retrieval to a listing of all the user's content libraries in an organization region in the graphical user interface used for article retrieving as well as content library searching, browsing, and organization. The organization region presents the user's searches and the user's content libraries. The content libraries each have an icon indicating whether that content library is stored locally, or whether the content library has been uploaded to a shared server accessible by other users. If a content library has been uploaded to a shared server, and the content library has been updated since the last time the user downloaded that content library locally, for example, to the user's computer, an icon on the content library will indicate to the user that the user no longer has the most updated version of that content library.

The article retrieving process from the shared server renders at least one content library in an organization region in a graphical user interface. The content library represents content (i.e., documents from various content source providers) that is accessible via a policy (i.e., a paid subscription). The article retrieving process receives a selection to obtain the content represented by the content library and a method to access each document, and renders content information that represents a listing of the content contained within the content library. The content information is displayed within a listing region which contains content information, or references to the content (i.e., documents from various content source providers).

Depending on whether the user trying to access the content information has access, the content information may represent content that is accessible to the user. That is, any user can view the content information within the listing region, but only users who have access to that content via its content source provider can access the content represented by the content listing. The article retrieving process downloads the content (from the relevant content source provider) for which access has been granted via the policy.

FIG. 1 is a block diagram illustrating example architecture of a computer system 110 that executes, runs, interprets, operates or otherwise performs an article retrieving application 140-1 and process 140-2. The computer system 110 may be any type of computerized device such as a personal computer, workstation, portable computing device, console, laptop, network terminal or the like. As shown in this example, the computer system 110 includes an interconnection mechanism 111 such as a data bus or other circuitry that couples a memory system 112, a processor 113, an input/output interface 114, and a communications interface 115. An input device 116 (e.g., one or more user controlled devices such as a keyboard, mouse, etc.) couples to processor 113 through I/O interface 114, and enables a user 108 to provide input commands and generally control the graphical user interface 160 that the article retrieving application 140-1 and process 140-2 provides on the display 130. The communications interface 115 enables the computer system 110 to communicate with other devices (i.e., other computers) on a network (not shown). More importantly, this allows access to the research databases and content source providers for the full exploitation of the system.

The memory system 112 is any type of computer readable medium and, in this example, is encoded with an article retrieving application 140-1. The article retrieving application 140-1 may be embodied as software code such as data and/or logic instructions (e.g., code stored in the memory or on another computer readable medium such as a removable disk) that supports processing functionality according to different embodiments described herein. During operation of the computer system 110, the processor 113 accesses the memory system 112, via the interconnect 111, in order to launch, run, execute, interpret or otherwise perform the logic instructions of the article retrieving application 140-1. Execution of article retrieving application 140-1 in this manner produces processing functionality in an article retrieving process 140-2. In other words, the article retrieving process 140-2 represents one or more portions of runtime instances of the article retrieving application 140-1 (or the entire application 140-1) performing or executing within or upon the processor 113 in the computerized device 110 at runtime.

It is noted that example configurations disclosed herein include the article retrieving application 140-1. The article retrieving application 140-1 may be stored on a computer readable medium (such as a floppy disk), hard disk, electronic, magnetic, and optical or other computer readable medium. The article retrieving application 140-1 may also be stored in a memory system 112 such as in firmware, read only memory (ROM), or, as in this example, as executable code in, for example, Random Access Memory (RAM). In addition to these embodiments, it should also be noted that other embodiments herein include the execution of the article retrieving application 140-1 in the processor 113 as the article retrieving process 140-2. Those skilled in the art will understand that the computer system 110 may include other processes and/or software and hardware components, such as an operating system not shown in this example.

A display 130 need not be coupled directly to computer system 110. For example, the article retrieving application 140-1 can be executed on a remotely accessible computerized device via the network interface 115. In this instance, the graphical user interface 160 may be displayed locally to a user of the remote computer and execution of the processing herein may be client-server based.

Further details of configurations explained herein will now be provided with respect to a flow chart of processing steps that show the high level operations disclosed herein to perform the article retrieving process 140-2.

Figure 2:
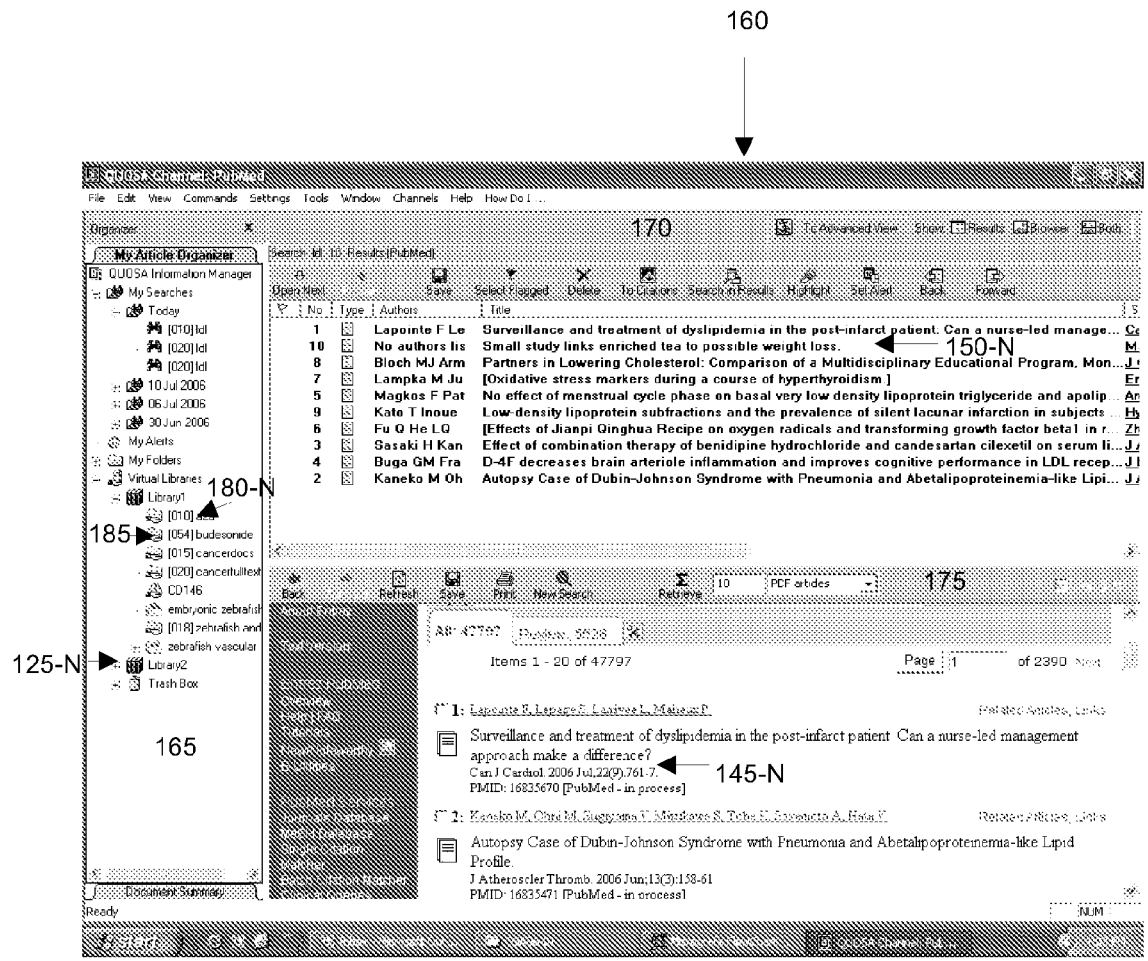
FIG. 2 is an example screenshot of the article retrieve process displaying the results of a search, according to one embodiment disclosed herein.

FIG. 2 is an example screen shot of the article retrieving process 140-2 graphical user interface 160. The graphical user interface 160 contains a listing region 170, organization region 165 and the view region 175. The listing region 170 contains content information 150-N containing references to the results of the retrieval of a set of articles resulting from a search performed within the view region 175. The view region 175 contains content 145-N (i.e., the results of the search). The organization region 165 contains content libraries 125-N containing folders 180-N, each folder 180-1 identified by an identifier 185.

Figure 3:
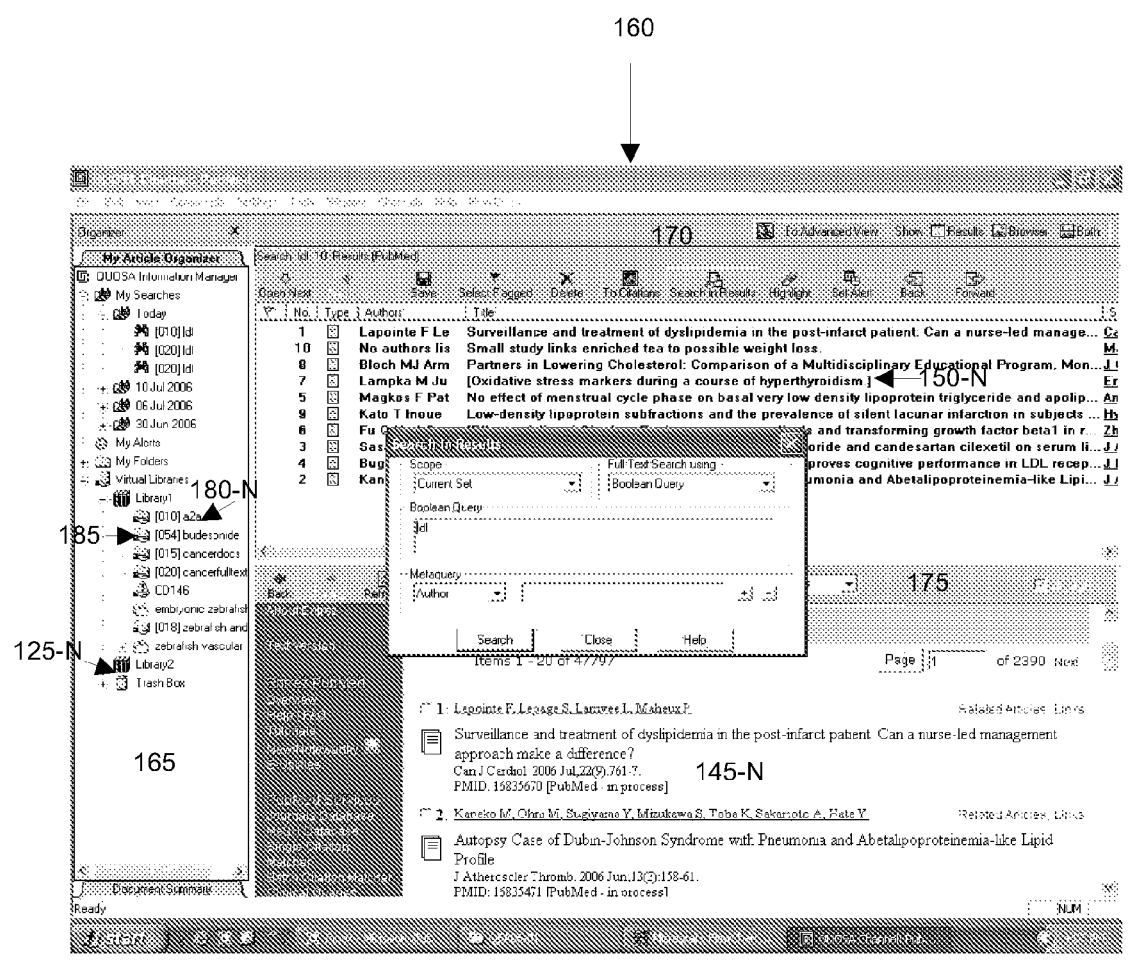

FIG. 3 is an example screen shot of the article retrieving process 140-2 graphical user interface 160. The graphical user interface 160 contains a listing region 170, organization region 165 and the view region 175. The listing region 170 contains content information 150-N containing references to the results of the retrieval of a set of articles resulting from a search performed within the view region 175. The view region 175 contains content 145-N (i.e., the results of the search). The organization region 165 contains content libraries 125-N containing folders 180-N, each folder 180-1 identified by an identifier 185. This example screenshot displays how a user 108 can perform a search on the results listed within the listing region 170. Note also that user 108 can specify which of the content 145-N from the view region is retrieved and subsequently listed as content information 150-N within the listing region by, for example, checking off the check box next to each content 145-1 displayed within the view region 175.

Figure 4:
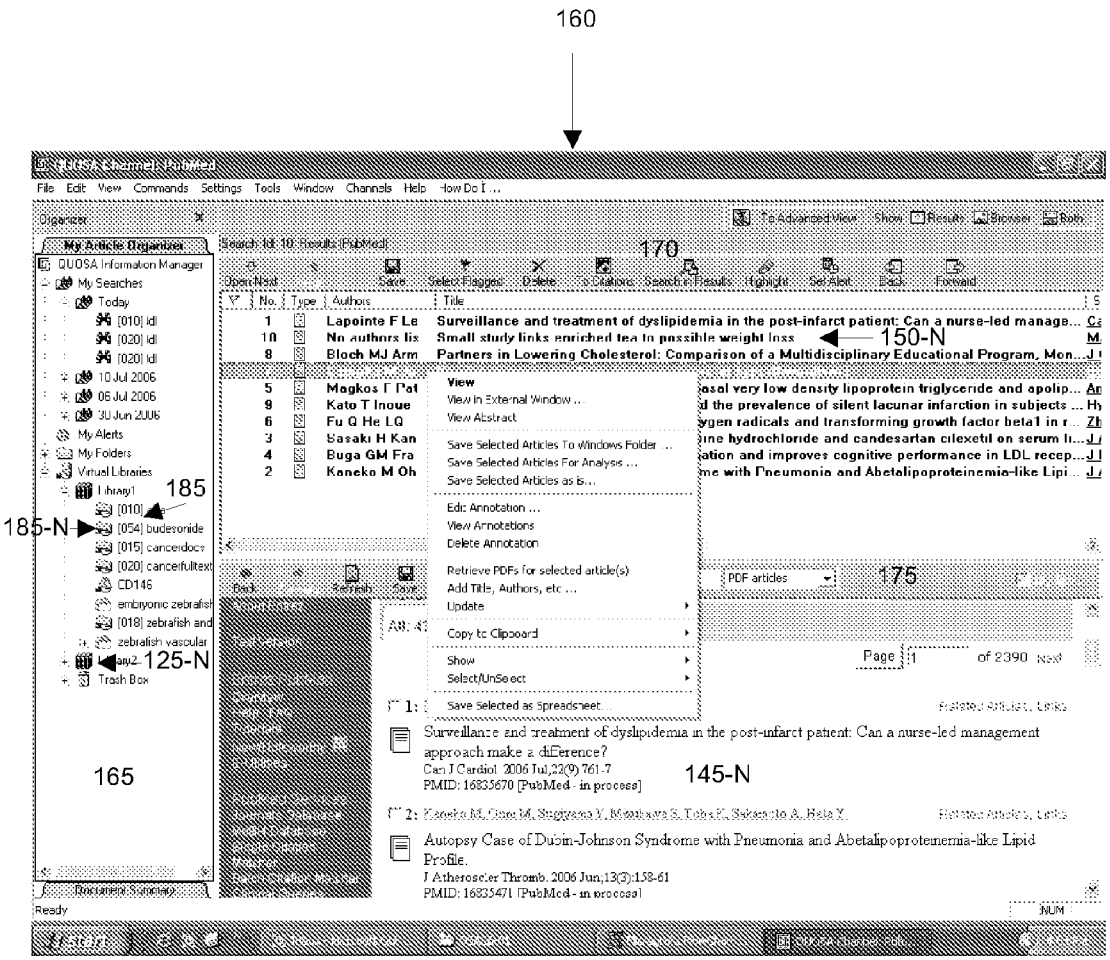
FIG. 4 is an example screenshot of the article retrieve process displaying options available within the listing region, according to one embodiment disclosed herein.

FIG. 4 is an example screen shot of the article retrieving process 140-2 graphical user interface 160. The graphical user interface 160 contains a listing region 170, organization region 165 and the view region 175. The listing region 170 contains content information 150-N containing references to the results of the retrieval of a set of articles resulting from a search performed within the view region 175. The view region 175 contains content 145-N (i.e., the results of the search). The organization region 165 contains content libraries 125-N containing folders 180-N, each folder 180-1 identified by an identifier 185. This example screenshot displays how a user 108 can perform actions on content information 150-N displayed within the listing region 170, such as edit, view or delete an annotation.

Figure 5:
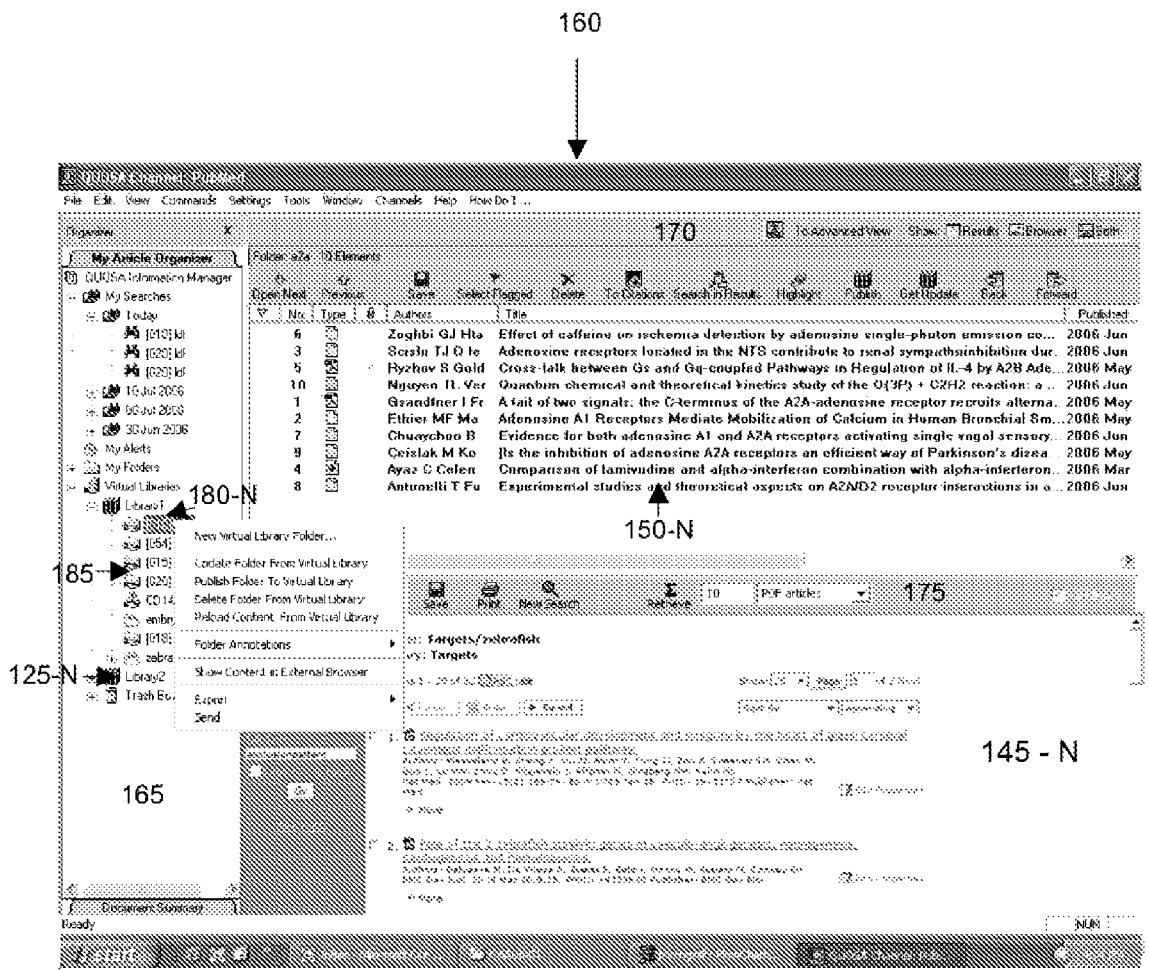
FIG. 5 is an example screenshot of the article retrieve process displaying options available within a content library displayed within the organization region, according to one embodiment disclosed herein.

FIG. 5 is an example screen shot of the article retrieving process 140-2 graphical user interface 160. The graphical user interface 160 contains a listing region 170, organization region 165 and the view region 175. The view region 175 contains content 145-N (i.e., the results of the search). The organization region 165 contains content libraries 125-N containing folders 180-N, each folder 180-1 identified by an identifier 185. This example screenshot displays how a user 108 can perform an action on a folder 180-N, such as update, publish (to a remote shared server), delete, or reload a folder 180-N within the organization region 165.

Figure 6:
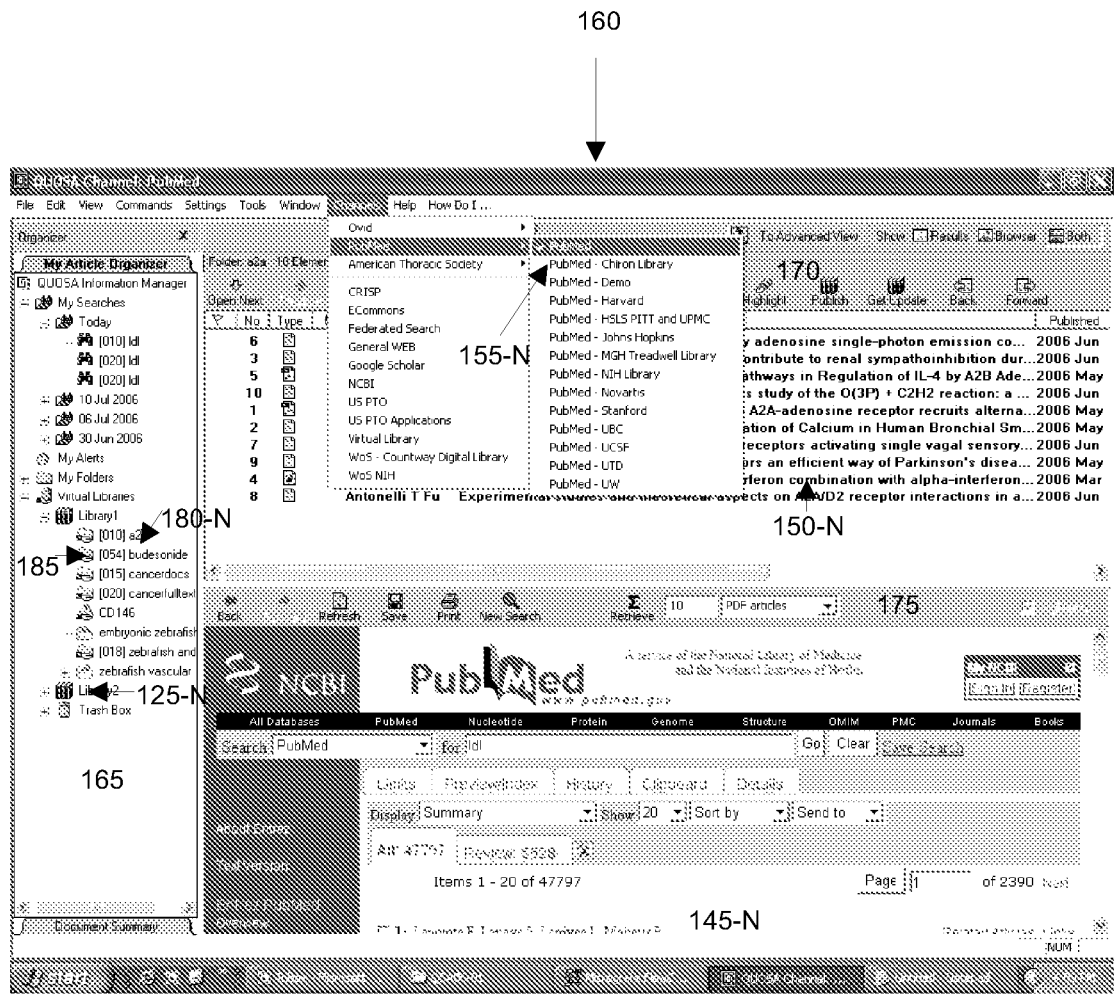
FIG. 6 is an example screenshot of the article retrieve process displaying a plurality of content source providers available, according to one embodiment disclosed herein.

FIG. 6 is an example screen shot of the article retrieving process 140-2 graphical user interface 160 displaying the research databases 155-N available to a user 108. The user 108 can select at least one research database 155-N from which to create content libraries 125-N. The graphical user interface 160 contains a listing region 170, organization region 165 and the view region 175. The listing region 170 contains content information 150-N containing references to the results of the retrieval of a set of articles resulting from a search performed within the view region 175. The view region 175 contains content 145-N (i.e., the results of the search). The organization region 165 contains content libraries 125-N containing folders 180-N, each folder 180-1 identified by an identifier 185. This example screenshot displays how a user 108 can select at least one research database 155-N from which to obtain content 145-N.

Figure 7:
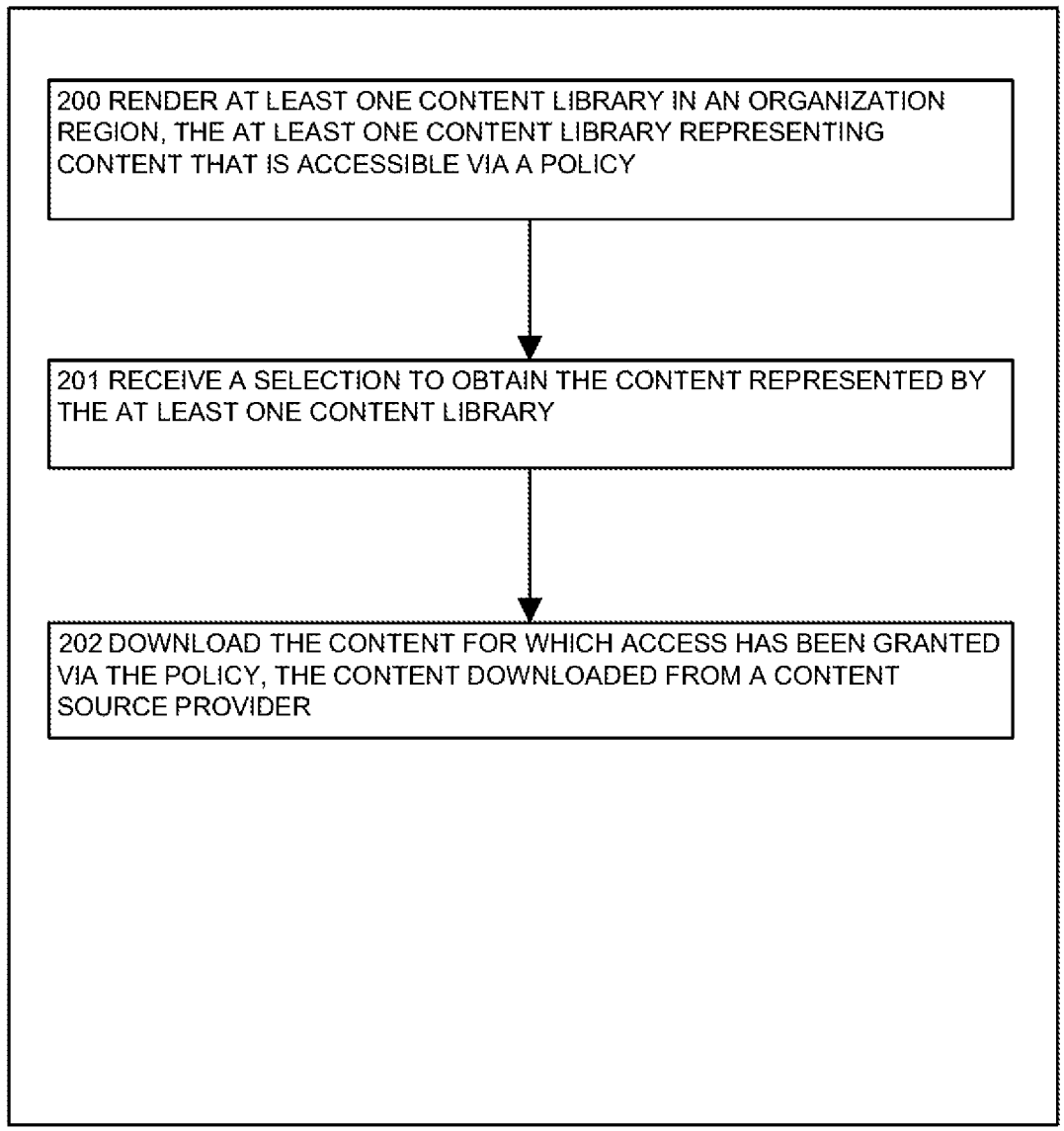
FIG. 7 illustrates a flowchart of a procedure performed by the system of FIG. 1 when the article retrieving process renders at least one content library in an organization region, the at least one content library representing content that is accessible via a policy, according to one embodiment disclosed herein.

FIG. 7 is a flowchart of the steps performed by the article retrieving process 140-2 when it renders at least one content library 125-1 in an organization region 165.

In step 200, the article retrieving process 140-2 renders at least one content library 125-1 in an organization region 165. The content library 125-1 represents content 145-N that is accessible via a policy (i.e., the content is accessible via a policy, such as a paid subscriptions to various content source providers). The organization region 165 displays retrievals performed by the user 108, and categorizes those as searches by the date on which the retrievals were performed. A user 108 can save a search or a selected subset thereof, for example, to a folder 180-1 by selecting (from within the graphical user interface 160) the search content or the selected subset of the search content with an input device 116, such as a mouse, and 'dragging' the selected set to the folder 180-1, then releasing the mouse 116. The user 108 can also create a new folder 180-1, name the new folder 180-1, and then copy the search content to the new folder 180-1. The user 108 can also publish the folder 180-1 to a shared server (i.e., a remote shared server) for other users 108 to access. The user can update the folder 180-1 from the content library, reload the content 145-N from the shared server, or even delete the folder 180-1 from the content library. The organization region 165 displays content libraries 125-N that can be comprised of folders 180-N.

In step 201, the article retrieving process 140-2 receives a selection to obtain the content 145-N represented by the content library 125-1. The organization region 165 displays content libraries 125-N arranged in a hierarchical order such that the content libraries 125-N contain folders 180-N, and the folders 180-N contain content from searches performed on research databases 155-N. A user 108 can select a folder 180-N with, for example, a mouse 116 to obtain the content 145-N represented by the content library 125-1.

In step 202, the article retrieving process 140-2 downloads the content 145-N for which access has been granted via the policy. The content 145-N is obtained from content source providers as specified by content information provided by the research databases 155-N. The user 108 can specify to obtain all or a selection of the content 145-N listed in the listing region 175. The user 108 can also select content for downloading from the content information 150-N by selecting individual listings in the listing region 170. Once the content 145-N is obtained (e.g., downloaded) from the content source provider into a content information listing 150-N, the user 108 can view and or save such content.

FIG. 8 is a flowchart of the steps performed by the article retrieving process 140-2 when it renders at least one content library 125-N (that represents content 145-N that is accessible via a policy) in an organization region 165.

In step 205, the article retrieving process 140-2 renders at least one content library 125-N (that represents content 145-N that is accessible via a policy) in an organization region 165. The content library 125-N can contain multiple folders 180-N representing content from searches performed by a user 108 on research databases 155-N.

In step 206, the article retrieving process 140-2 receives a selection of the at least one research database 155-N from which to create the content library 125-1. A user 108, via the graphical user interface 160, selects at least one research database 155-N. FIG. 6 displays an example screen shot of the graphical user interface 160 with the at least one research database 155-N selections displayed. The selection of the at least one research database 155-N produces the view region 175 with the at least one research database 155-N search web page. Via the graphical user interface 160 toolbar, the user 108 can select to view only the view region 175, or the view region and the listing region 170 simultaneously. The organization region 165 is also displayed to the user 108

In step 207, the article retrieving process 140-2 receives at least one search criterion with which to filter content 145-N on the at least one research database 155-N. A user 108 enters a search criterion into the at least one research database 155-N search web page.

In step 208, the article retrieving process 140-2 performs a search on the at least one research database 155-N using the search criterion provided by the user 108. The results of the search are displayed within the view region 175.

In step 209, the article retrieving process 140-2 creates the content library 125-N from a result of the search on the at least one research database 155-N. Via a toolbar on the view region 175, the user 108 selects the amount of content 145-N (i.e., a number of articles, documents, etc.) to retrieve as a result of the search. The results of that retrieval are displayed as content information 150-N within the listing region 170.

In step 210, the article retrieving process 140-2 stores the content library 125-1 locally. Within the organization region 165, the article retrieving process 140-2 displays that result under a folder 180-N titled 'Searches". The user 108 can now move the new search to a content library 125-N by selecting the search content or a subset thereof with a mouse 116, and "dragging" the selected content to the content library 125-N. The user 108 can provide a name for the search and can store that search locally, for example, on the user's 108 computer.

FIG. 9 is a flowchart of the steps performed by the article retrieving process 140-2 when it creates the content library 125-N from a result of the search on the at least one research database 155-N.

In step 211, the article retrieving process 140-2 creates the content library 125-N from a result of the search on the at least one research database 155-N. After the search has been performed on the at least one research database 155-N, the user 108 can specify how the content library 125-N is to be created.

In step 212, the article retrieving process 140-2 receives a selection of a format in which to retrieve the content 145-N from the content source providers specified by content from the at least one research database 155-N. Within the view region 175, a user 108 can specify a format for the content 145-N when creating the content library 125-N. For example, the user 108 can specify that the article retrieving process 140-2 retrieve content 145-N from the specified content source provider in PDF format or HTML format. The user 108 specifies the format, for example, via a drop down menu on the toolbar on the view region 170.

In step 213, the article retrieving process 140-2 receives an indication of an amount of content 145-N to retrieve from the specified content source provides. Within the view region 175, a user 108 can specify an amount of content 145-N (i.e., a number of articles, documents, etc.) when creating the content library 125-N. For example, the user 108 specifies the number of articles to retrieve, for example, via an input field on the toolbar on the view region 175.

Figure 10:
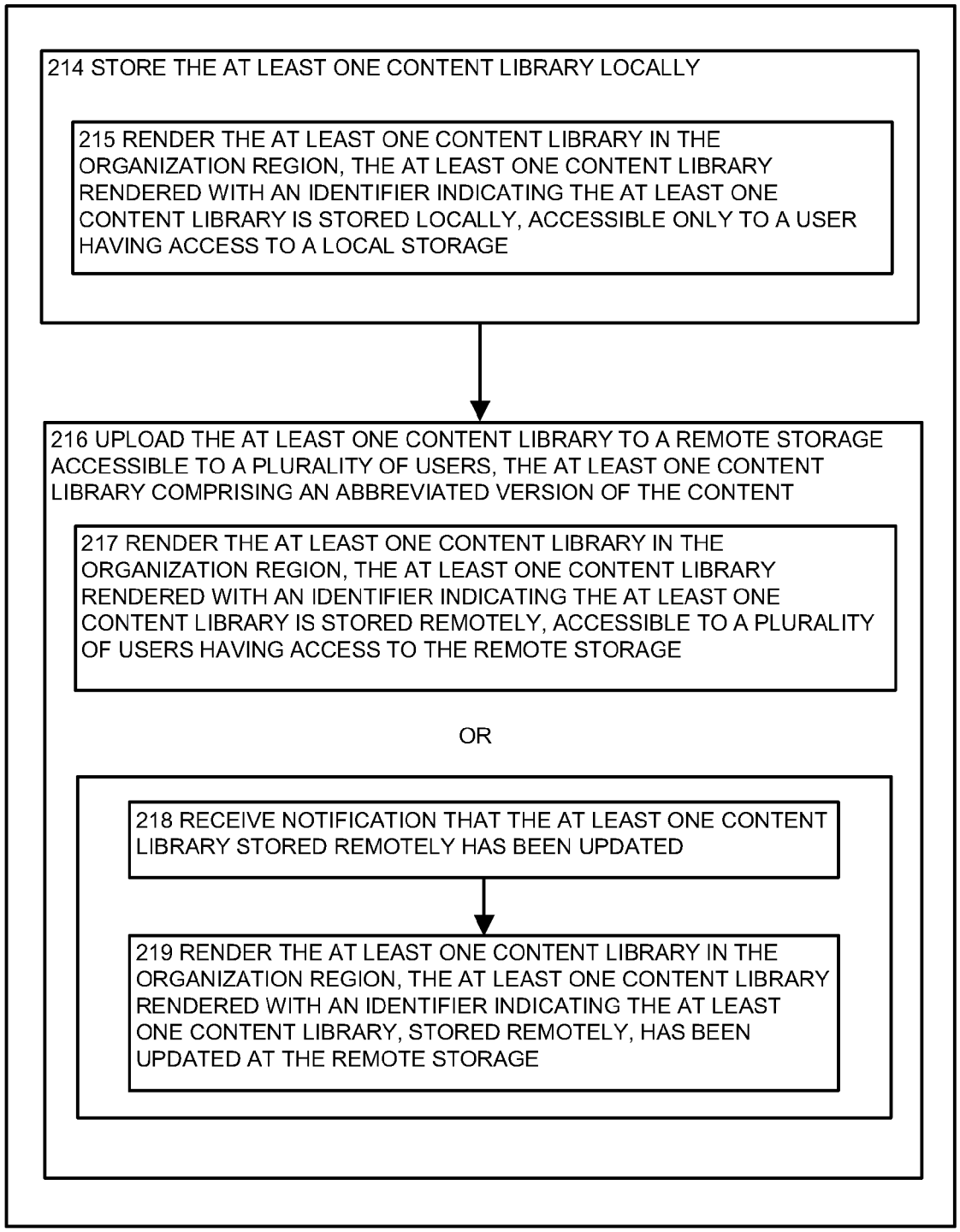
FIG. 10 illustrates a flowchart of a procedure performed by the system of FIG. 1 when the article retrieving process stores the at least one content library locally, according to one embodiment disclosed herein.

FIG. 10 is a flowchart of the steps performed by the article retrieving process 140-2 when it stores the content library 125-1 locally.

In step 214, the article retrieving process 140-2 stores the content library 125-N locally, for example, on the user's 108 computer. In step 215, the article retrieving process 140-2 renders the content library 125-N in the organization region 165. The content library 125-N is rendered with an identifier indicating the content library 125-N is stored locally (i.e., accessible only to a user 108 having access to a local storage). For example, a user 108 creates a content library 125-N that is stored locally, for example, on the user's 108 computer. The locally stored content library 125-N is displayed within the organization region 165, with an icon, indicating the content library 125-N is only available to that user 108.

In step 216, the article retrieving process 140-2 uploads the content library 125-N to a remote storage, accessible to a plurality of users 108. The content library 125-N comprises an abbreviated version of the content 145-N. FIG. 5 displays an example screen shot of the options presented to the user 108 within the organization region 165. The user 108 can upload a locally stored content library 125-N (excluding the full-text documents themselves) to a remote storage (i.e., a remote server) such that other users 108 can also access that content library 125-N. In this scenario, the user 108 who created the content library 125-N may have added annotations to the content library 125-N. After uploading the content library 125-N to the remote storage, other users 108 can access the content library 125-N, including the annotations.

In step 217, the article retrieving process 140-2 renders the content library 125-N in the organization region 165. The content library 125-N is rendered with an identifier indicating the content library 125-N is stored remotely, accessible to a plurality of users 108 having access to the remote storage. In an example embodiment, the content library 125-N is rendered in the organization region 165 with an icon that indicates the content library 125-N has been uploaded to a remote server, and is accessible to users 108 who have access to that remote storage.

Alternatively, in step 218, the article retrieving process 140-2 receives notification that the content library 125-N stored remotely has been updated. In an example embodiment, a first user 108 creates a content library 125-N, and uploads the content library 125-N to a remote server. The content library 125-N is displayed in the first user's 108 organization region 165 with an icon indicating the content library 125-N has been uploaded to a remote server. A second user 108 views the content library 125-N, and adds annotations to the content library 125-N. The article retrieving process 140-2 receives notification that the content library 125-N has been updated since the first user 108 initially uploaded the content library 125-N to the remote server.

In step 219, the article retrieving process 140-2 renders the content library 125-N in the organization region 165. The content library 125-N is rendered with an identifier indicating the content library 125-N, stored remotely, has been updated at the remote storage. In an example configuration, the organization region 165 on the user's 108 displays the content library 125-N with an icon indicating the content library 125-N has been updated during the time period from when the user 108 either first created the content library 125-N, or downloaded the content library 125-N from a remote server.

FIG. 11 is a flowchart of the steps performed by the article retrieving process 140-2 when it receives a selection to obtain the content 145-N represented by the content library 125-N.

In step 220, the article retrieving process 140-2 receives a selection to obtain the content 145-N represented by the content library 125-N. FIG. 5 displays an example screenshot of the options presented to a user 108 within the organization region 165. A content library 125-N can consist of one or more folders 180-N. A user can perform various actions on a folder 180-N within the organization region 165.

In step 221, the article retrieving process 140-2 receives a selection to view an annotation associated with at least one content folder 180-N associated with a content library 125-N. An annotation provides an explanation associated with the content folder 180-N. A user 108 navigates to the organization region 165, and selects a content folder 180-N. A user 108 opens a folder options window and selects "Folder Annotations".

Alternatively, in step 222, the article retrieving process 140-2 receives a selection to edit the annotation associated with content folder 180-N. A user can display annotations associated with a content folder 180-N and modify existing annotations. Any modifications made to a content folder 180-N are identified with a timestamp of the modification and the name of the user 108 making the modifications.

FIG. 12 is a flowchart of the steps performed by the article retrieving process 140-2 when it renders content information 150-N that represents a listing of the content 145-N contained within the content library 125-N.

In step 223, the article retrieving process 140-2 renders content information 150-N that represents a listing of the content 145-N contained within the content library 125-N. The content information 150-N is displayed within a listing region 170 wherein the content 145-N may be accessible via the policy. The actual content 145-N may or may not be accessible to a user 108 depending on whether that user 108 has access to the content 145-N. The listing of the content information 150-N does not indicate access to the specified content source provider for each item in the listing. The content library 125-N can consist of content folders 180-N. Each content folder 180-N can contain content 145-N in form of files (i.e., documents, articles, etc.).

In step 224, the article retrieving process 140-2 obtains a location associated with a file within the content folder 180-N within the content library 125. The article retrieving process 140-2 identifies a location of the file, such as the specified content source provider from which the file can be retrieved.

In step 225, the article retrieving process 140-2 associates the location of the file with the content information 150-N. The article retrieving process 140-2 creates content information 150-N that links the location of the file with the content information 150-N, such as the title of the file, etc.

In step 226, the article retrieving process 140-2 displays the content information 150-N with a content identifier identifying a format associated with the file. The content information 150-N is displayed within the listing region 170. The content identifier, for example, indicates a type of file available, such as PDF format, or whether only an abstract of the file is available.

Figure 13:
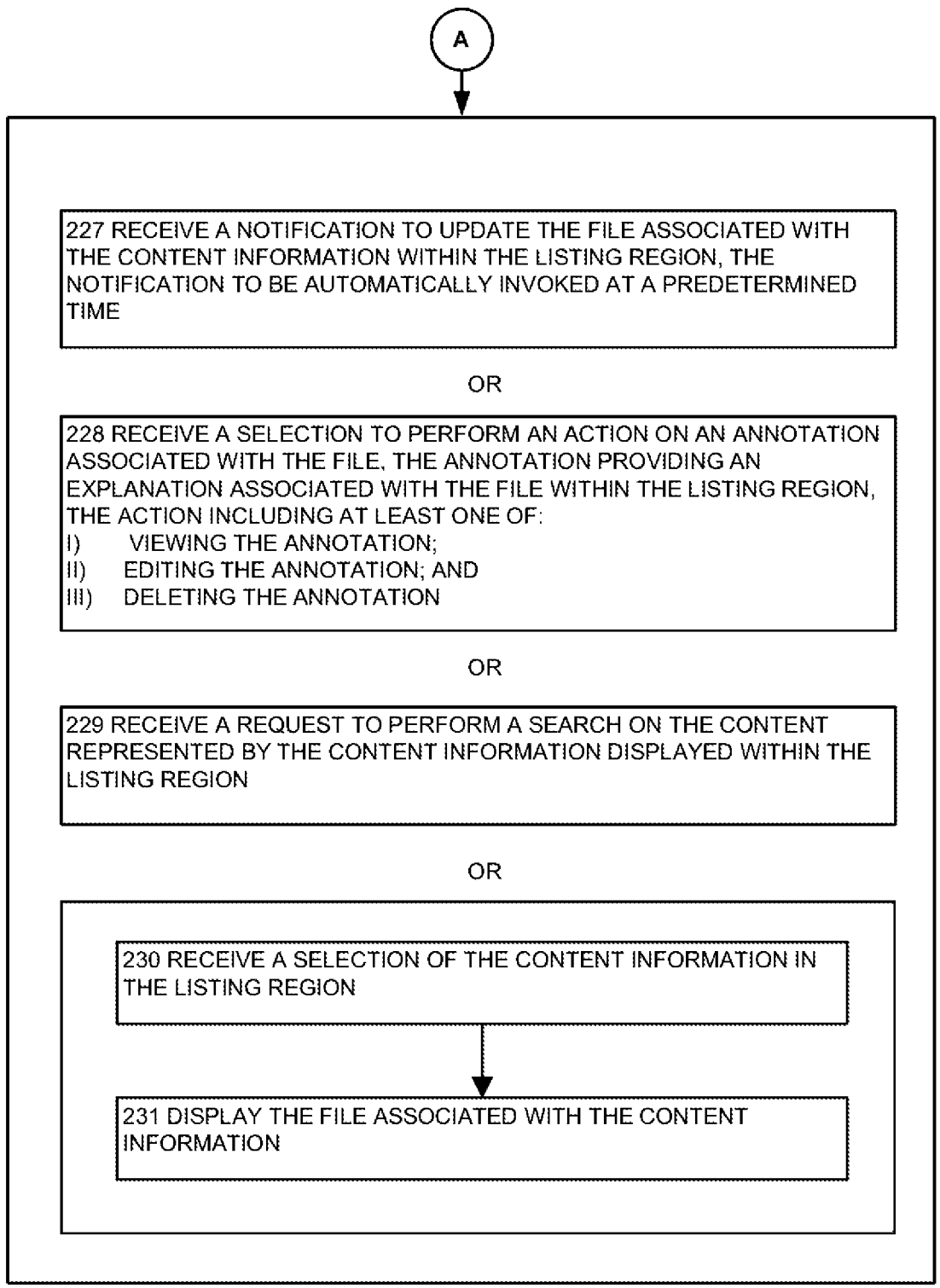
FIG. 13 illustrates a flowchart of a procedure performed by the system of FIG. 1 when the article retrieving process displays the content information with a content identifier identifying a format associated with the file, according to one embodiment disclosed herein.

FIG. 13 is a continuation of a flowchart of the steps of FIG. 12 when the article retrieving process 140-2 displays the content information 150-N with a content identifier identifying a format associated with the file.

Figure 17:
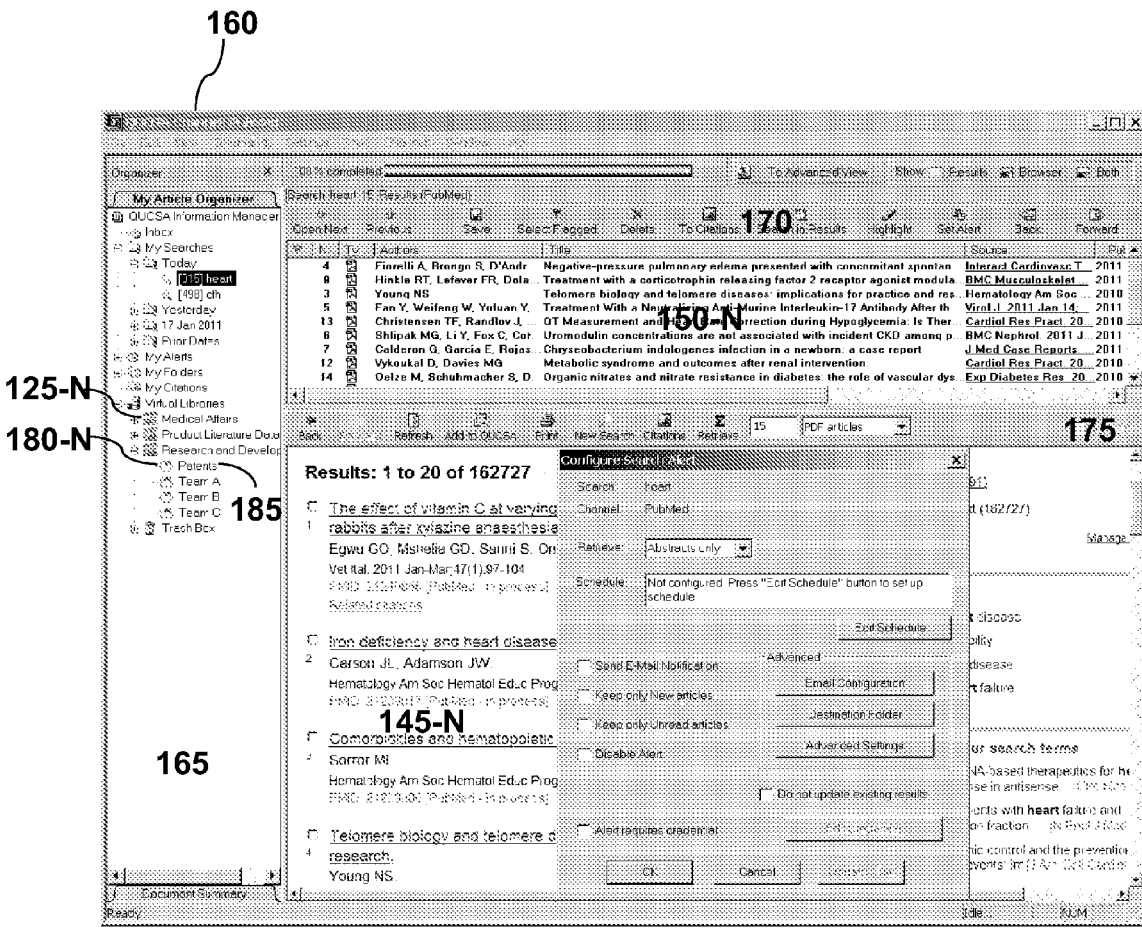
FIG. 17 is an example screenshot of the article retrieve process displaying options available within the listing region, according to one embodiment disclosed herein.

In step 227, the article retrieving process 140-2 receives a notification to update the file associated with the content information 150-N within the listing region 170. The notification is to be automatically invoked at a predetermined time. FIG. 17 displays an example screen shot of the listing region 170, displaying options available within the listing region 170. A user 108 can set an alert that automatically updates the content information 150-N at a predetermined time. Thus, if the content information 150-N has been saved as a content library 125-N, the content library 125-N will be updated at the time specified within the alert. Alerts are also displayed within the organization region 165 within the graphical user interface 160.

Alternatively, in step 228, the article retrieving process 140-2 receives a selection to perform an action on an annotation associated with the file. The annotation provides an explanation associated with the file within the listing region 170. The action can include at least one of:
  i) viewing the annotation;
  ii) editing the annotation; and
  iii) deleting the annotation.

In an example embodiment, a user 108 performs a search in a search web page of at least one research database 155-N. From the results of that search, the user 108 selects the content 145-N (in the view region 175) from which to create a content library 125-N, and selects "Retrieve" from a tool bar in the view region 175. The article retrieving process 140-2 retrieves the content 145-N, and compiles content information 150-N in the listing region 170. A user 108 can select one or more content information 150-N from the listing region 170 and perform actions on those selections. FIG. 4 displays an example screenshot of the options available to a user 108 within the listing region 170.

Alternatively, in step 229, the article retrieving process 140-2 receives a request to perform a search on the content represented by the content information 150-N displayed within the listing region 170. FIG. 3 displays an example screen shot depicting a search window within the listing region 170. A user 108 can search within the results of the content information 150-N to further refine the search results, and compile a more relevant content library 125-N.

Alternatively, in step 230, the article retrieving process 140-2 receives a selection of the content information 150-N in the listing region 170. A toolbar in the listing region 170 allows a user 108 to select one or more content information 150-N to perform an action on the selected content information 150-N.

In step 231, the article retrieving process 140-2 displays the file associated with the content information 150-N. If the user 108 has been granted access to the file (e.g., the user has a paid subscription to the content source provider specified by the citation provided by the at least one research database 155-N), the user 108 can select content information 150-N from the listing region 170 and display the file represented by the content information 150-N in the view region 175.

Figure 14:
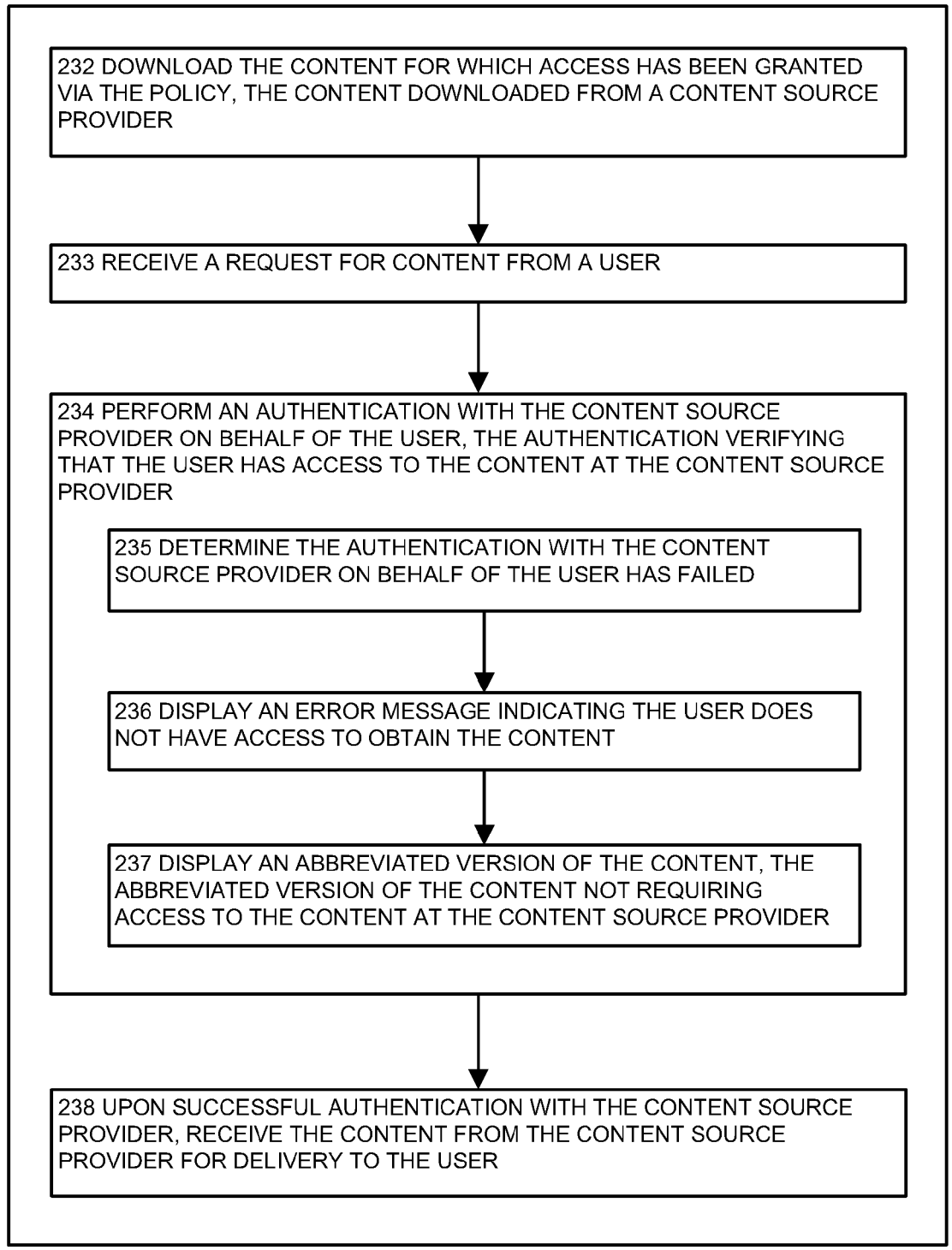
FIG. 14 illustrates a flowchart of a procedure performed by the system of FIG. 1 when the article retrieving process downloads the content for which access has been granted via the policy, the content downloaded from a content source provider, according to one embodiment disclosed herein.

FIG. 14 is a flowchart of the steps performed by the article retrieving process 140-2 when it downloads the content 145-N for which access has been granted via the policy.

In step 232, the article retrieving process 140-2 downloads the content 145-N for which access has been granted via the policy. The content is obtained from content source providers specified by the information provided by the at least one research database 155-N. The user 108 can also select content to be downloaded from the content information 150-N by selecting individual listings in the listing region 170. Once the content is obtained from the relevant content source providers and listed as content information 150-N, the user 108 can view and or save the content 150-N.

In step 233, the article retrieving process 140-2 receives a request for content 145-N from a user 108. A user 108 can request this in a variety of ways. The user 108 can also select the content from the content information 150-N by selecting individual listings in the listing region 170.

In step 234, the article retrieving process 140-2 performs an authentication with the content source provider on behalf of the user 108. The authentication verifies that the user 108 has access to the content at the relevant content source provider. The article retrieving process 140-2 performs the steps of logging into the content source provider on behalf of the user 108.

In step 235, the article retrieving process 140-2 determines the authentication with the content source provider on behalf of the user 108 has failed. In one example embodiment, the article retrieving process 140-2 determines the user 108 does not have access to the content 145-N provided by the content source provider, and the authentication fails.

In step 236, the article retrieving process 140-2 displays an error message indicating the user 108 does not have access to obtain the content 145-N. Upon failure of the authentication process, the article retrieving process 140-2 displays an error message on the graphical user interface 160.

In step 237, the article retrieving process 140-2 displays an abbreviated version of the content 145-N. The abbreviated version of the content 145-N does not require access to the content 145-N at the content source provider. If the authentication process fails, the article retrieving process 140-2 displays abstracts, or abbreviated versions of the content 145-N. Typically no access is required to view abstracts from a content source provider.

Alternatively, upon successful authentication with the content source provider, in step 238, the article retrieving process 140-2 receives the content 145-N from the content source provider for delivery to the user 108. If the authentication process with the content source provider (on behalf of the user 108) is successful, the article retrieving process 140-2 displays the content 145-N to the user 108 as content information 150-N.

Figure 15:
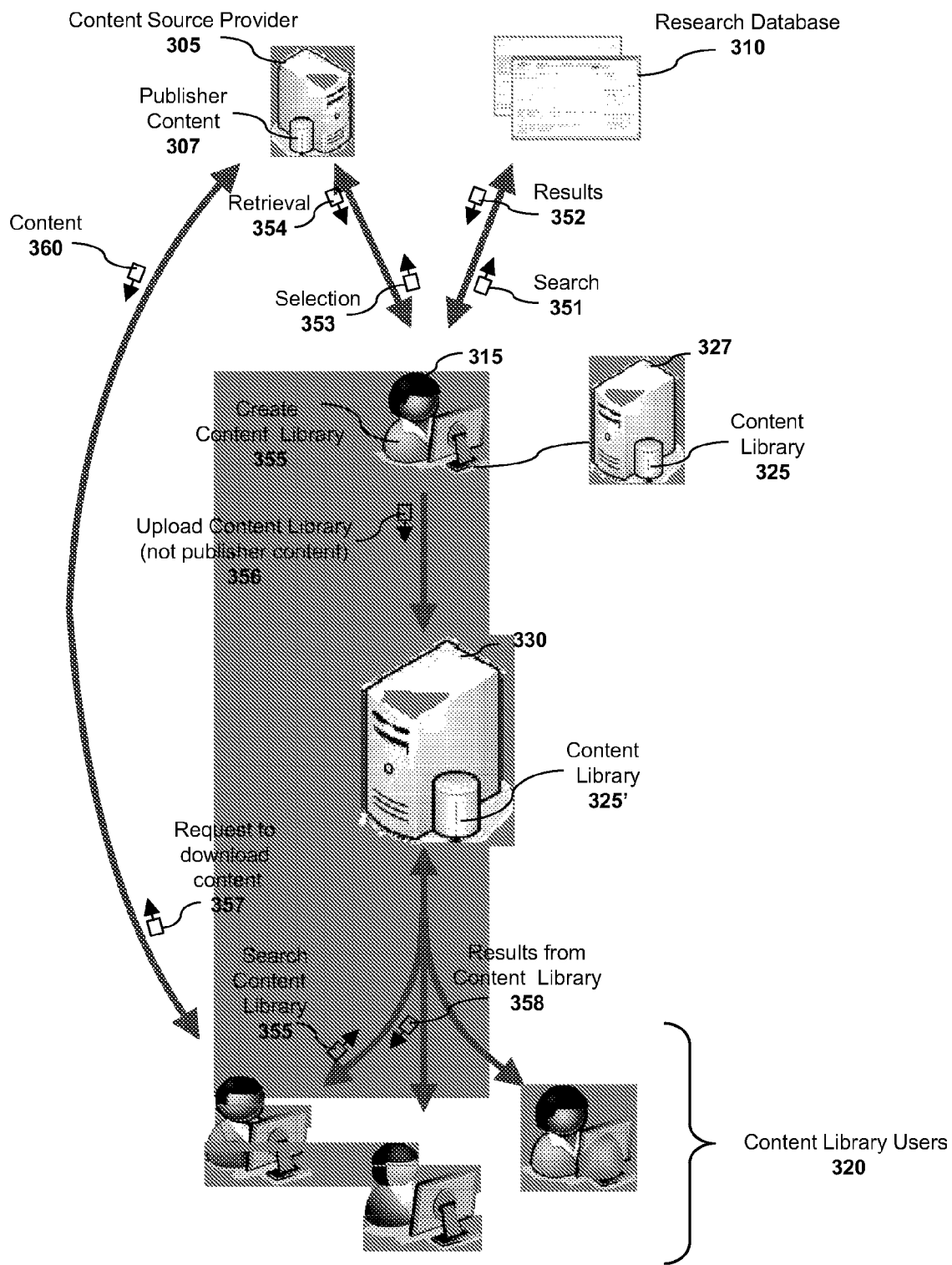
FIG. 15 is a block diagram illustrating a system for maintaining content.

FIG. 15 is a diagram illustrating a system 300 for maintaining content. The system 300 includes a content source provider 305, at least one research database 310 (understood in the art as having references to publisher content 307 at the content source provider 305), a content library manager 315 (i.e., a first user), a plurality of content library users 320 (i.e., other users) and a content library 325. As described above, the content library 325 may be stored locally at the content library manager's computer 327. Additionally, the content library 325' may be stored at a shared storage 330 accessible to both the content library manager 315 and the content library users 320. Publisher content at the content source provider 305 may include journal articles, clinical trials reports, and conference proceedings. Research databases 310 may include databases such as PubMed, OvidSP and Embase.

During an example operation of one embodiment, suppose a user (e.g., content library manager 315), using the article retrieving process via a graphical user interface (not shown) (e.g., graphical user interface 160 of FIG. 1) as described above with reference to FIGS. 1-14, wants to perform research that may be of value to other colleagues (e.g., content library users 320). The content library manager 315 selects at least one research database 310, such as a medical research database, and performs a search (351). The at least one research database 310 (e.g., medical research database) returns results (352) in the form of abbreviated versions (i.e., abstracts and/or citation information references) of the content (i.e., medical articles listed on the medical research database), including references to publisher content 307, in the view region of the graphical user interface. The content library manager 315 reviews the abstracts or references and selects, for example, ten of them by selecting a check box next to each one within the view region of the graphical user interface, then selects 'Retrieve" (353) from the view region toolbar. The selected publisher content is then retrieved from the relevant content source providers 305 according to a policy and as determined by the reference to the publisher content 307 provided by the at least one research database 310. As described above, only users 315, 320 having the right of access to the publisher content at the relevant content source providers 305 will be able to retrieve the publisher content. Otherwise, users 315, 320 will only be able to retrieve the abbreviated versions (i.e., abstracts and/or citation information references). The selected publisher content is then retrieved (354) from the relevant content source providers 305 according to a policy and as determined by the reference to the publisher content 307 provided by the at least one research database 310.

In the listing region, content information associated with the selected abstracts or references is displayed. The content information includes the author of each of the publisher content documents as well as the title associated with each one. An icon next to each of the references listed indicates the format (i.e., PDF, HTML, etc.) of the downloaded publisher content (i.e., document, article, etc.) associated with each abstract or reference.

To avoid limitations in the search and analysis of the documents in the content library a full text index of the content library documents is created on the content library manager's computer 327 (355). The content information is a reference to the actual publisher content (i.e., documents, articles, etc.) at the content source provider 305 and data structures needed to build full text search capability on the server in the content library 325. The content library manager 315 may add an annotation to several of the documents, and may edit some of the annotations to include more information for the content library users 320. Additionally, the content library 325 may include content made available locally at the content library manager's 315 computer 327. Moreover, the content library 325 may store full text content as permitted by the policy.

The content library 325 is stored on the content library manager's 315 computer 327, and is displayed within an organization region within the article retrieving process graphical user interface. The content library 325 is displayed with an icon indicating the content library is available locally only to the content library manager 315. The content library manager 315 selects the content library 325 from the organization view and uploads the content library 325, including the full-text index of the library but not the actual documents (i.e., publisher content at the content source provider 305), to a server 330 (356) so that the content library manager's 315 colleagues (i.e., the content library users 320) can also view and search in the content library 325'.

The content library 325' in the user's organization view is now displayed with an icon indicating the content library 325' has been uploaded to a server 330, and is available to other users (i.e., the content library users 320). The content library users 320 can access the content library 325', including viewing the annotations provided by the content library manager 315. The content library users 320 can search the content library 325' (357), including searches based on full text content, and, based on results from the search of the content library 325' (358), download the desired content from the relevant content source providers 305 (359, 360). If any of the content library users 320 modify the content library 325', the icon on the content library manager's 315 organization view will indicate the content library 325' has been modified since the last time the content library manager 315 downloaded the content library 325' from the server 330.

Further, each respective user 320 of the plurality of content library users 320 is able to create the content library from content retrieved by the respective user 320 via the policy. In other words, the content library manager 315 and content library users 320 are interchangeable such that each respective content library user 320 may act as the content library manager 315 when performing searches for creating the content library 325 or making any other contributions to the content library, including making annotations or providing content made available of that content library user's 320 computer.

Figure 16A:
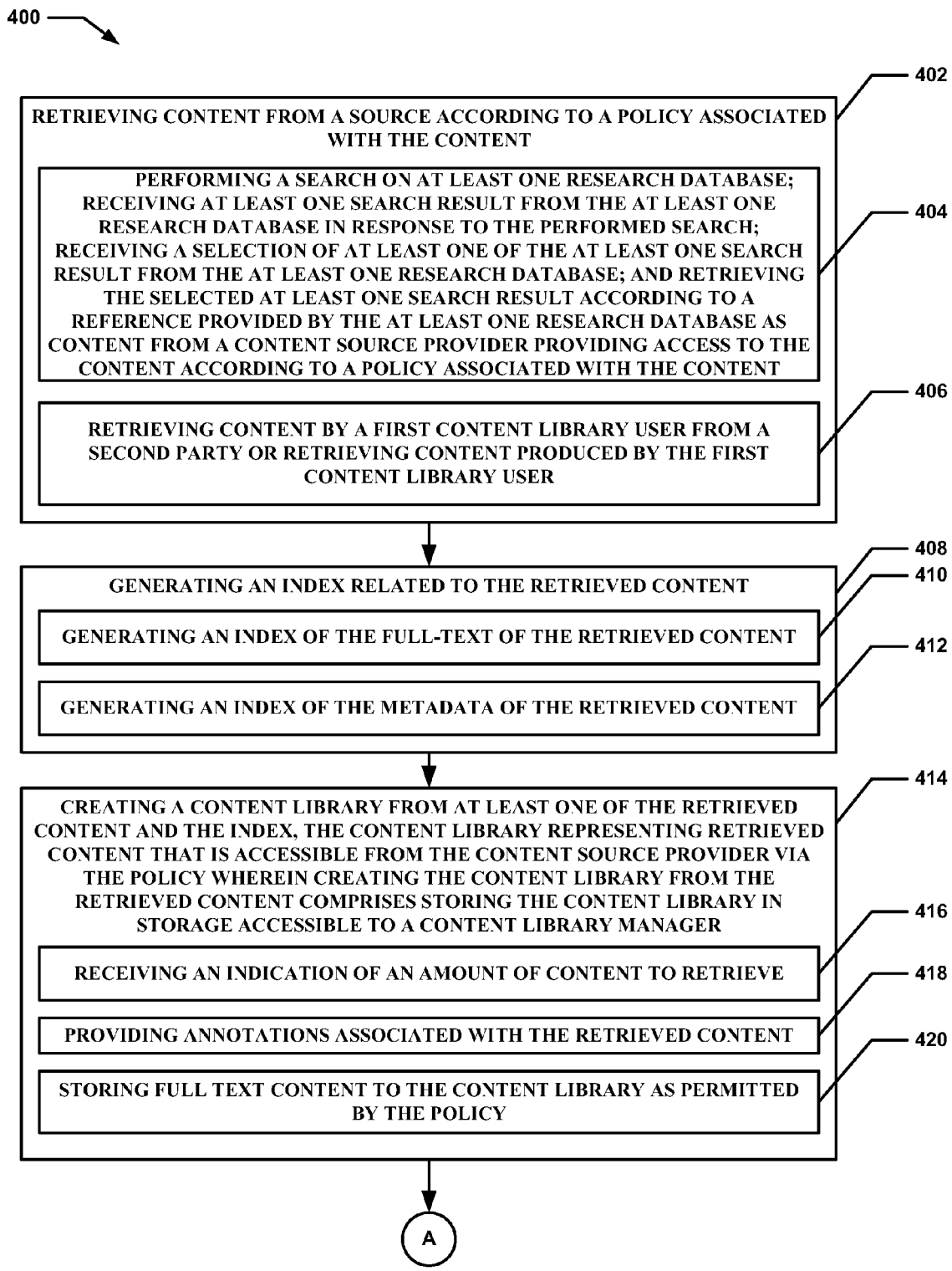
FIGS. 16A, B and C depict a flow diagram of a particular embodiment of a method for performing post-search automated full-article retrieval in accordance with embodiments of the invention.
Figure 16B:
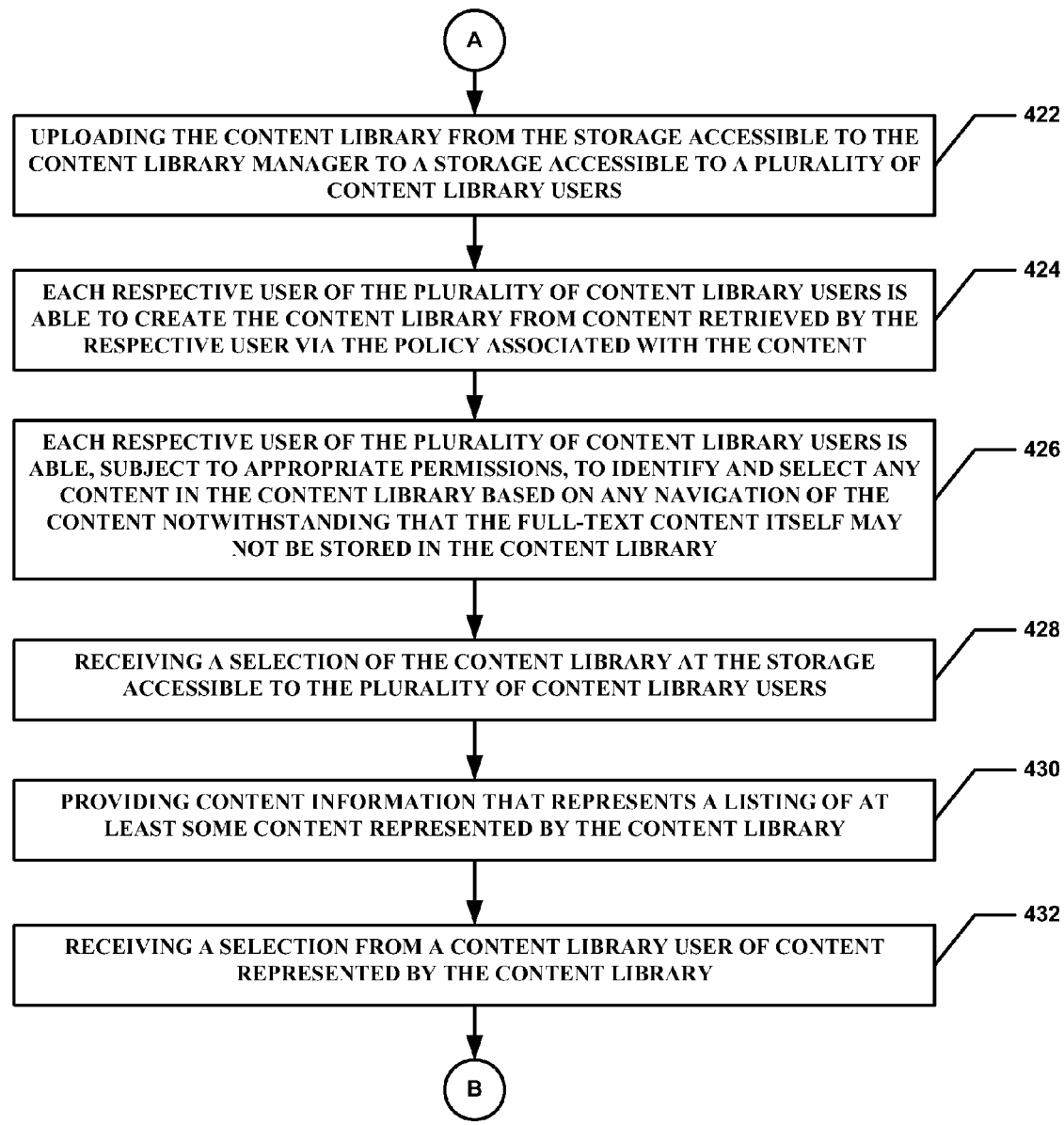
Figure 16C:
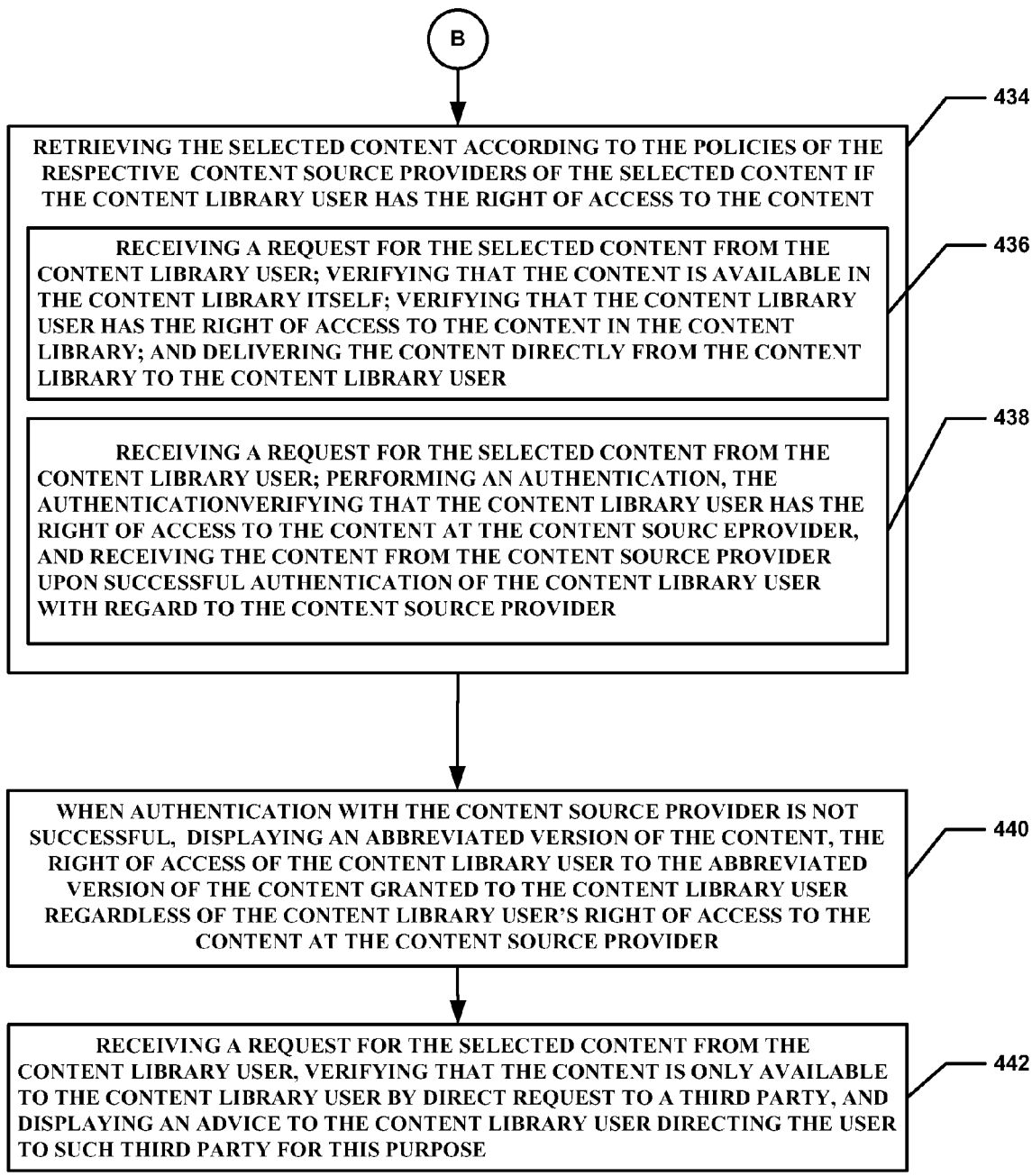

A flow chart of a particular embodiment of the presently disclosed method is depicted in FIGS. 16A-C. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIGS. 16A-C, method 400 starts with processing block 402 which discloses retrieving content from a source according to a policy associated with the content. As shown in processing block 404, this can include the steps of performing a search on at least one research database, receiving at least one search result from the at least one research database in response to the performed search, receiving a selection of at least one of the at least one search result from the at least one research database, and retrieving the selected at least one search result according to a reference provided by the at least one research database as content from a content source provider providing access to the content according to a policy associated with the content. As shown in processing block 406, the retrieving content can include retrieving content by a first content library user from a second party (e.g., a colleague or co-worker or any other single content source such as a web site or the content library itself) and retrieving content produced by the first content library user (e.g., a user generated document).

Processing block 408 states generating an index related to the retrieved content. As shown in processing block 410 this can include generating an index of the full-text of the retrieved content and as shown in processing block 412 this can further include generating an index of the metadata of the retrieved content. Metadata can include abstracts, titles, annotations, document formats and the like.

Processing block 414 recites creating a content library from at least one of the retrieved content and the index, the content library representing retrieved content that is accessible from the content source provider via the policy wherein creating the content library from the retrieved content comprises storing the content library in storage accessible to a content library manager. This can further include, as shown in processing block 416, receiving an indication of an amount of content to retrieve. As shown in processing block 418 this can also include comprises providing annotations associated with the retrieved content. As shown in processing block 420 this can also include storing full text content to the content library as permitted by the policy.

Processing continues with processing block 422 which discloses uploading the content library from the storage accessible to the content library manager to a storage accessible to a plurality of content library users. Processing block 424 states each respective user of the plurality of content library users is able to create the content library from content retrieved by the respective user via the policy associated with the content. Processing block 426 states each respective user of the plurality of content library users is able, subject to appropriate permissions, to identify and select any content in the content library based on any navigation of the content notwithstanding that the full-text content itself may not be stored in the content library.

Processing block 428 recites receiving a selection of the content library at the storage accessible to the plurality of content library users. Processing block 430 discloses providing content information that represents a listing of at least some content represented by the content library. Processing block 432 discloses receiving a selection from a content library user of content represented by the content library.

Processing continues with processing block 434 which states retrieving the selected content according to the policies of the respective content source providers of the selected content if the content library user has the right of access to the content. As shown I processing block 436 this can include receiving a request for the selected content from the content library user, verifying that the content is available in the content library itself, verifying that the content library user has the right of access to the content in the content library, and delivering the content directly from the content library to the content library user. As shown in processing block 438, this can also include receiving a request for the selected content from the content library user, performing an authentication, the authentication verifying that the content library user has the right of access to the content at the content source provider, and receiving the content from the content source provider upon successful authentication of the content library user with regard to the content source provider.

Processing block 440 discloses when authentication with the content source provider is not successful, displaying an abbreviated version of the content, the right of access of the content library user to the abbreviated version of the content granted to the content library user regardless of the content library user's right of access to the content at the content source provider.

Processing block 442 states receiving a request for the selected content from the content library user, verifying that the content is only available to the content library user by direct request to a third party, and displaying an advice to the content library user directing the user to such third party for this purpose.

The device(s) or computer systems that integrate with the processor(s) may include, for example, a personal computer (s), workstation(s) (e.g., Sun, HP), personal digital assistant (s) (PDA(s)), handheld device(s) such as cellular telephone (s), laptop(s), handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation. Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the Internet, as well as a virtual network. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein. Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A method comprising:
retrieving content from a content source provider according to an access right associated with a first user, the access right controlling whether the retrieved content includes publisher content or an abbreviated version of the publisher content;
generating an index related to the retrieved content;
creating a content library from at least one of the retrieved content or the index, the content library representing retrieved content that is accessible from the content source provider, the content library including one or more references to publisher content associated with the retrieved content;
uploading the content library to a storage accessible to a second user;
receiving a request from the second user for publisher content associated with a reference included in the content library;
performing an authentication with the content source provider to determine whether the second user has a right of access to the requested publisher content; and
if it is determined that the second user has a right of access to the requested publisher content, displaying the requested publisher content, otherwise, displaying an abbreviated version of the requested publisher content.

2. The method of claim 1 wherein generating an index related to the retrieved content further comprises:
generating an index of a full-text of the retrieved content.

3. The method of claim 1 wherein generating an index related to the retrieved content further comprises:
generating an index of metadata of the retrieved content.

4. The method of claim 1 wherein retrieving further comprises:
performing a search on a research database;
receiving at least one search result from the research database in response to the performed search;
receiving a selection of at least one of the at least one search result from the research database; and
retrieving the selected at least one search result according to a reference provided by the research database as content from the content source provider.

5. The method of claim 1 wherein retrieving further comprises:
retrieving content produced by the first user; and
including the retrieved content produced by the first user in the retrieved content from the content source provider.

6. The method of claim 1 wherein the first user specifies which content in the retrieved content is stored in the content library.

7. The method of claim 1 wherein the first user selects content in the content library based on a navigation of the content.

8. The method of claim 1 wherein creating the content library from at least one of the retrieved content or the index further comprises:
receiving an indication of an amount of content to retrieve.

9. The method of claim 1 wherein creating the content library from at least one of the retrieved content or the index further comprises:
including one or more annotations associated with the retrieved content in the content library.

10. The method of claim 1 wherein creating the content library from at least one of the retrieved content or the index further comprises:
storing full text content in the content library as permitted by the access right associated with the first user.

11. The method of claim 1 further comprising:
receiving a selection of the content library at the storage accessible to the second user;
providing content information that represents a listing of at least some content represented by the content library;
receiving a selection of content represented by the content library from the second user; and
retrieving the selected content from the content source provider based on the second user having access to the selected content.

12. The method of claim 11 wherein retrieving the selected content from the content source provider further comprises:
receiving a request for the selected content from the second user;
verifying that the selected content is available in the content library;
verifying that the second user has a right of access to the selected content in the content library; and
delivering the selected content directly from the content library to the second user.

13. The method of claim 11 wherein retrieving the selected content from the content source provider further comprises:
receiving a request for the selected content from the second user;
performing an authentication, the authentication verifying that the second user has a right of access to the selected content at the content source provider; and
receiving the selected content from the content source provider upon successful authentication of the second user with regard to the content source provider.

14. The method of claim 13 wherein authentication with the content source provider is not successful, and wherein the method further comprises:
displaying an abbreviated version of the selected content regardless of a right of access of the second user to the selected content at the content source provider.

15. The method of claim 11 wherein retrieving the selected content from the content source provider further comprises:
receiving a request for the selected content from the second user;
verifying that the selected content is only available to the second user by direct request to a third party; and
displaying an advice to the second user, the advice directing the second user to the third party.

16. The method of claim 1, further comprising:
storing the content library in storage accessible to a content library manager.

17. The method of claim 16, wherein uploading the content library includes:
uploading the content library from the content library manager to the storage accessible to the second user.

18. A non-transitory computer readable medium having computer readable code stored thereon for maintaining content, the medium including instructions in which a computer system performs operations comprising:
retrieving content from a content source provider according to an access right associated with a first user, the access right controlling whether the retrieved content includes publisher content or an abbreviated version of the publisher content;
generating an index related to the retrieved content;
creating a content library from at least one of the retrieved content or the index, the content library representing retrieved content that is accessible from the content source provider, the content library including one or more references to publisher content associated with the retrieved content
uploading the content library to a storage accessible to a second user;
receiving a request from the second user for publisher content associated with a reference included in the content library;
performing an authentication with the content source provider to determine whether the second user has a right of access to the requested publisher content; and
if it is determined that the second user has a right of access to the requested publisher content, displaying the requested publisher content, otherwise, displaying an abbreviated version of the requested publisher content.

19. The non-transitory computer readable medium of claim 18 wherein the medium further includes instructions to cause the computer to further perform the operations of:
generating an index of a full-text of the retrieved content.

20. The non-transitory computer readable medium of claim 18 wherein the medium further includes instructions to cause the computer to further perform the operations of:
generating an index of metadata of the retrieved content.

21. The non-transitory computer readable medium of claim 18 wherein the medium further includes instructions to cause the computer to further perform the operations of:
performing a search on a research database;

receiving at least one search result from the research database in response to the performed search;

receiving a selection of at least one of the at least one search result from the research database; and retrieving the selected at least one search result according to a reference provided by the research database as content from the content source provider.

22. The non-transitory computer readable medium of claim 18 wherein the medium further includes instructions to cause the computer to further perform the operations of:

retrieving content produced by the first user; and including the retrieved content produced by the first user in the retrieved content from the content source provider.

23. The non-transitory computer readable medium of claim 18 wherein the first user specifies which content in the retrieved content is stored in the content library.

24. The non-transitory computer readable medium of claim 18 wherein the first user selects content in the content library based on a navigation of the content.

25. The non-transitory computer readable medium of claim 18 wherein the medium further includes instructions to cause the computer to further perform the operations of:

receiving an indication of an amount of content to retrieve.

26. The non-transitory computer readable medium of claim 18 wherein the medium further includes instructions to cause the computer to further perform the operations of:

including one or more annotations associated with the retrieved content in the content library.

27. The non-transitory computer readable medium of claim 18 wherein the medium further includes instructions to cause the computer to further perform the operations of:

storing full text content to the content library as permitted by the access right associated with the first user.

28. The non-transitory computer readable medium of claim 18 further including instructions to cause the computer to further perform the operations of:

receiving a selection of the content library at the storage accessible to the second user;

providing content information that represents a listing of at least some content represented by the content library;

receiving a selection of content represented by the content library from the second user; and retrieving the selected content from the content source provider based on the user having access to the selected content.

29. The non-transitory computer readable medium of claim 28 wherein the medium further includes instructions to cause the computer to further perform the operations of:

receiving a request for the selected content from the second user;

verifying that the selected content is available in the content library;

verifying that the second user has a right of access to the selected content in the content library; and delivering the selected content directly from the content library to the second user.

30. The non-transitory computer readable medium of claim 28 wherein the medium further includes instructions to cause the computer to further perform the operations of:

receiving a request for the selected content from the second user;

performing an authentication, the authentication verifying that the second user has a right of access to the selected content at the content source provider; and receiving the selected content from the content source provider upon successful authentication of the second user with regard to the content source provider.

31. The non-transitory computer readable medium of claim 28 wherein the medium includes instructions to cause the computer to further perform the operations of:

displaying an abbreviated version of the selected content regardless of a right of access of the second user to the selected content at the content source provider.

32. The non-transitory computer readable medium of claim 28 wherein the medium includes instructions to cause the computer to further perform the operations of:

receiving a request for the selected content from the second user;

verifying that the selected content is only available to the second user by direct request to a third party; and displaying an advice to the second user, the advice directing the second user to the third party.

\* \* \* \* \*